United States Patent
Matsufuji

[11] Patent Number: 6,044,720
[45] Date of Patent: Apr. 4, 2000

[54] DRIVE TRANSMISSION ASSEMBLY FOR WORKING VEHICLES

[75] Inventor: Mizuya Matsufuji, Sanda, Japan

[73] Assignee: Kanzaki Kokyukoki Mfg. Co., Ltd., Amagasaki, Japan

[21] Appl. No.: 09/243,275

[22] Filed: Feb. 2, 1999

[30] Foreign Application Priority Data

Apr. 13, 1998 [JP] Japan .................................. 10-120082

[51] Int. Cl.[7] ...................................................... F16H 3/02
[52] U.S. Cl. ................................. 74/331; 74/325; 74/330
[58] Field of Search ............................ 74/330, 331, 333, 74/335, 325, 606 R

[56] References Cited

U.S. PATENT DOCUMENTS

| | | | |
|---|---|---|---|
| 4,023,418 | 5/1977 | Zenker | 74/331 X |
| 4,041,805 | 8/1977 | Jochmann | 74/331 X |
| 4,148,382 | 4/1979 | Yamaoka et al. | 74/331 X |
| 4,579,015 | 4/1986 | Fukui | 74/331 X |
| 4,658,663 | 4/1987 | Hiraiwa | 74/330 X |
| 4,697,471 | 10/1987 | Hiketa | 74/330 X |
| 5,573,471 | 11/1996 | Shubinsky et al. | 74/325 X |
| 5,599,247 | 2/1997 | Matsufuji | 475/128 |

FOREIGN PATENT DOCUMENTS 8-20257  1/1996  Japan .

*Primary Examiner*—Khoi Q. Ta

[57] ABSTRACT

A direction-reversing mechanism (20) is disposed between a primary shaft (17) and output shaft (19) which are arranged in parallel with each other with the output shaft being arranged at a level lower than that of the primary shaft. A first fluid-operated speed change mechanism (23) is disposed between a first drive shaft (21), arranged co-axially with and coupled to the output shaft, and a first driven shaft (22) arranged in parallel with the drive shaft. The drive shaft is arranged at a level lower than that of the driven shaft, and plural fluid-actuated clutches (63, 64, 65) are mounted on the drive shaft. A second fluid-operated speed change mechanism (24) is disposed between a second drive shaft (26), arranged co-axially with and coupled to the first driven shaft, and a second driven shaft (27) arranged in parallel with the second drive shaft. The second driven shaft is arranged at a level lower than that of the second drive shaft, and plural fluid-actuated clutches (75, 76, 77) are mounted on the second driven shaft. The fluid-actuated clutches mounted on the transmission shafts (21, 27) of low levels do not highten the level of an upper surface of the vehicle body and allows to arrange valve means for the first and second change mechanisms concentratedly on an outer surface of the vehicle body.

14 Claims, 23 Drawing Sheets

DRIVE TRANSMISSION ASSEMBLY FOR WORKING VEHICLES

FIELD OF THE INVENTION

This invention relates to a drive transmission assembly for transmitting vehicle-driving power in a working vehicle such as a tractor.

BACKGROUND OF THE INVENTION

There is known from JP, A No. 8-20257 a drive transmission assembly for working vehicles in which a first fluid-operated speed change mechanism and a second fluid-operated speed change mechanism are arranged within a vehicle body in series in a longitudinal direction of the vehicle body and are connected in series with each other. The first fluid-operated speed change mechanism is operable to perform a speed change transmission between a first drive shaft and a first driven shaft, which are arranged in parallel with each other, by a selective actuation of plural fluid-actuated clutches, whereas the second fluid-operated speed change mechanism is operable to perform a speed change transmission between a second drive shaft and a second driven shaft by a selective actuation of plural fluid-actuated clutches. In the drive transmission assembly disclosed in the above-referenced publication, a direction-reversing mechanism, operable between a primary shaft and an output shaft, is further arranged at a location in front of the first fluid-operated speed change mechanism and is connected thereto in series.

When first and second fluid-operated speed change mechanisms, each of which is operable by a selective actuation of plural fluid-actuated clutches, are provided such that they are connected in series with each other, a speed change transmission of multi-ratios corresponding to the product of change ratios of the first and second speed change mechanisms can be achieved easily because the actuation of fluid-actuated clutches is readily controlled by control valve means.

In the direction-reversing mechanism employed in the transmission assembly disclosed in the above-referenced publication, the output shaft is arranged co-axially with the primary shaft, on which a forward directional fluid-actuated clutch and a backward directional fluid-actuated clutch are mounted, and a counter shaft extending in parallel with the primary shaft is provided at a level below the primary shaft. The output shaft is driven to rotate in the forward running direction of vehicle when the forward directional fluid-actuated clutch is actuated to connect the output shaft directly to the primary shaft, whereas the output shaft is driven to rotate in the backward running direction of vehicle when the backward directional fluid-actuated clutch is actuated to transmit power from the primary shaft to the output shaft through the counter shaft via backward directional gearing. The first drive shaft of first fluid-operated speed change mechanism is integral with the output shaft of a high level, and the first fluid-operated speed change mechanism is structured such that it is operable to perform a speed change transmission between the first drive shaft and the first driven shaft of a low level by a selective actuation of the fluid-actuated clutches which are mounted on the first drive shaft. The second fluid-operated speed change mechanism includes the second drive shaft which is an extension of the first driven shaft of a low level, the driven shaft which is arranged co-axially with the second drive shaft, and a counter shaft which is arranged co-axially with the first drive shaft. The second fluid-operated speed change mechanism is structured such that it provides a high change ratio when a fluid-actuated clutch mounted on the second driven shaft is actuated to connect this driven shaft directly to the second drive shaft whereas it provides a low change ratio when another fluid-actuated clutch mounted on the second driven shaft is actuated to transmit power from the second drive shaft to the second driven shaft through the counter shaft via speed-reduction gearing.

In the above referenced drive transmission assembly disclosed in JP, A No. 8-20257, the plural fluid-actuated clutches of first fluid-operated speed change mechanism are mounted on the first drive shaft of a high level so that the level of an upper surface of the vehicle body is hightened, at a location where these clutches are arranged, because of the large outer size of clutch cylinders of the fluid-actuated clutches. Because first and second fluid-operated speed change mechanisms are usually arranged within the vehicle body at a location in front of a seat for an operator as viewed in a longitudinal direction of the vehicle body, the above referenced arrangement of fluid-actuated clutches hightens the level of an upper surface of the vehicle body at a location around the legs of the operator so that so-called "leg space" is narrowed and the operator has a hardship. Further, although the first and second fluid-operated speed change mechanisms are arranged in series in a longitudinal direction of the vehicle, respective fluid-actuated clutches of these change mechanisms are mounted on the first drive shaft of a high level and on the second driven shaft of a low level so that it is difficult to concentratedly arrange the valve means for the first and second fluid-operated speed change mechanisms or it is required to employ lengthy fluid piping if concentrated arrangement of the valve means is employed. Furthermore, the fluid-actuated clutches of first fluid-operated speed change mechanism, which are arranged at a high level, are not immersed in oil stored within the vehicle body so that these clutches are insufficiently cooled.

Accordingly, a primary object of the present invention is to provide a novel drive transmission assembly for working vehicles in which all the fluid-actuated clutches of first and second fluid-operated speed change mechanisms are mounted on the transmission shafts of low levels so that the level of an upper surface of the vehicle body is kept low, cooling of these clutches is sufficiently attained, and the valve means for these fluid-actuated clutches can be concentratedly arranged.

An attendant object of the invention is to provide an improved drive transmission assembly in which a direction-reversing mechanism is provided in a reasonable manner for achieving the above referenced primary object.

Another attendant object is to provide an improved drive transmission assembly which can easily be assembled.

SUMMARY OF THE INVENTION

The present invention relates to a drive transmission assembly for working vehicles comprising: a first fluid-operated speed change mechanism (23) operable to perform a speed change transmission between a first drive shaft (21) and a first driven shaft (22), which are arranged in parallel with each other, by a selective actuation of plural fluid-actuated clutches (63, 64, 65), and a second fluid-operated speed change mechanism (24) operable to perform a speed change transmission between a second drive shaft (26) and a second driven shaft (27) by a selective actuation of plural fluid-actuated clutches (75, 76, 77). The first and second speed change mechanisms (23, 24) are arranged within a vehicle body (2) in series in a longitudinal direction of the vehicle body and are connected in series with each other.

In accordance with the present invention, the first drive shaft (21) is arranged at a level lower than that of the first driven shaft (22) and the plural fluid-actuated cluches (63, 64, 65) of the first speed change mechanism (23) are mounted on the first drive shaft (21). The second drive shaft (26) is arranged co-axially with and is coupled to the first driven shaft (22) whereas the second driven shaft (27) is arranged in parallel with the second drive shaft (26) at a level lower than that of the second drive shaft (26), and the plural fluid-actuated clutches (75, 76, 77) of the second fluid-operated speed change mechanism (24) are mounted on the second driven shaft (27).

According to the present invention, the first and second fluid-operated speed change mechanisms (23, 24) are connected in series with each other because the second drive shaft (26) is arranged co-axially with and is coupled to the first driven shaft (26). Because the drive shaft (21), on which the fluid-actuated clutches (63, 64, 65) of first fluid-operated speed change mechanism are mounted, and the second driven shaft (27), on which the fluid-actuated clutches (75, 76, 77) of second fluid-operated speed change mechanism are mounted, are arranged respectively at levels lower than those of the first driven shaft (22) and second drive shaft (26), these fluid-actuated clutches are all mounted on the transmission shafts (21, 27) of low levels. Accordingly, the level of an upper surface of the vehicle body is not hightened by clutch cylinders of the plural fluid-actuated clutches of the first speed change mechanism and by clutch cylinders of the plural fluid-actuated cylinders of the second speed change mechanism so that the level of an upper surface of the vehicle body is kept low so as to enlarge a free space for the operator's legs. Further, these fluid-actuated clutches are all immersed in oil stored within the vehicle body so that cooling of the clutches is enhanced. Futhermore, because the first drive shaft (21) or the fluid-actuated clutches mounted thereon and the second driven shaft (27) or the fluid-actuated clutches mounted thereon are arranged adjacently in a longitudinal direction of the vehicle body at approximately the same level, the valve means for these fluid actuated clutches can be concentratedly arranged with the piping therebetween kept short by arranging the valve means, for example, on an outer surface of the vehicle body adjacent to the transmission shafts (21, 27) at levels of these shafts.

In accordance with a preferred embodiment of the present invention, the vehicle body (2) comprises a first body housing (3), which has an open rear end and includes therein the first fluid-operated speed change mechanism (23), and a second body housing (4) which has an open front end and includes therein the second fluid-operated speed change mechanism (24) and which is secured to the first body housing. Further, a bearing support frame (41) for supporting rear end portions of the first drive and driven shafts (21, 22) and for supporting front end portions of the second drive and driven shafts (26, 27) is disposed within the vehicle body (2) and is fixedly attached to one of the first and second body housings (3, 4). According to this embodiment, the first fluid-operated speed change mechanism can be assembled into the first body housing (3) from the rear end opening thereof and the second fluid-operated change mechanism can be assembled into the second body housing (4) from the front end opening thereof. Then, the bearing support frame (41) can be attached to one of the body housing (3; 4) with end portions of the two shafts (21, 22; 26, 27) being supported by the support frame. The body housings (3, 4) can then be fastened together with end portions of the other two shafts being supported by the supporting frame. Thus, the transmission assembly can easily be assembled.

For an easier assembly of the transmission assembly, it is preferred that the first driven shaft (22) and the second drive shaft (26) are detachably coupled to each other by a coupling member (68) which is disposed within the bearing support frame (41).

Preferably, a direction-reversing mechanism (20) operable to change running direction of the vehicle between a primary shaft (17) and an output shaft (19), which are arranged in parallel with each other with the output shaft being arranged at a level lower than that of the primary shaft, is arranged within the vehicle body (2) at a location in front of the first fluid-operated speed change mechanism (23), and the first drive shaft (21) is arranged co-axially with and is coupled to the output shaft (19). According to this structure, the output shaft (19), arranged at a low level in the direction-reversing mechanism (20), transmits power directly to the first drive shaft (21) arranged at a low level in the first fluid-operated speed change mechanism (23). Thus, the direction-reversing mechanism is provided in a reasonable manner in that the first drive shaft, having thereon plural fluid-actuated clutches of the first fluid-operated speed change mechanism, is connected to the output shaft of the direction-reversing mechanism in the simplest way.

Preferably, the direction-reversing mechanism (20) is of an easily oprerable fluid-operated type which comprises a forward directional fluid-actuated clutch (50) and a backward directional fluid-actuated clutch (51) which are mounted on the primary shaft (17). Because the drive transmission line is cut off when both of the forward and backward directional fluid-actuated cluthes (50, 51) are in their neutral conditions, these clutches can be used as a main clutch. The fluid-actuated clutches mounted on the primary shaft (17) of a high level are not immersed in oil stored in the vehicle body so that transmission of the drag torque, which can be transmitted in the neutral conditions of both of the clutches, is reduced.

In accordance with a preferred embodiment of the present invention, the vehicle body (2) includes in it a first bearing support frame (40), for supporting rear end portions of the primary shaft (17) and output shaft (19) and for supporting front end portions of the first drive and driven shafts (21, 22), and a second bearing support frame (41) for supporting rear end portions of the first drive and driven shafts (21, 22) and for supporting front end portions of the second drive and driven shafts (26, 27). The first drive shaft (21) includes in it fluid passages (92A, 92B, 92C) for supplying fluid to the clutches (63, 64, 65) of the first fluid-operated speed change mechanism (23), and the first bearing support frame (40) includes in it first rotary joint portions (94) for connecting the fluid passages (92A, 92B, 92C) in the first drive shaft (21) to stationary fluid passages. Further, the second driven shaft (27) includes in it fluid passages (93A, 93B, 93C) for supplying fluid to the fluid-actuated clutches (75, 76, 77) of the second fluid-operated speed change mechanism (24), and the second bearing support frame (41) includes in it second rotary joint portions (95) for connecting the fluid passages (93A, 93B, 93C) in the second driven shaft (27) to stationary fluid passages. According to this structure, the first and second bearing support frames (40, 41) are used for supporting the transmission shafts of the direction-reversing mechanism (20) and first and second fluid-operated speed change mechanisms (23, 24) as well as for providing rotary joints (94, 95) for clutch-actuating fluid supply passages. Thus, the transmission assembly can easily be assembled.

For an easier assembly, the vehicle body (2) comprises a first body housing (3), which includes the direction-reversing mechanism (20) and the first fluid-operated speed change mechanism (23), and a second body housing (4) which includes the second fluid-operated speed change mechanism (24). The first bearing support frame (40) is fixedly supported by the first body housing (3) and the second bearing support frame (41) is fixedly supported by one of the first and second body housings (3, 4). Further, the first rotary joint portions (94) are provided by annular fluid chambers (94A, 94B, 94C) disposed between the first drive shaft (21) and the first bearing support frame (40) whereas the second rotary joint portions (95) are provided by annular fluid chambers (95A, 95B, 95C) disposed between the second driven shalt (27) and the second bearing support frame (41). The above referenced annular fluid chambers can be provided by covering annular grooves in each of outer circumferences of the first drive shaft and second driven shaft by each of an inner surface of the first and second bearing support frames. Thus, these annular fluid chambers can be provided at a same time when rear end portion of the first drive shaft is supported by the first bearing support frame and front end portion of the second driven shaft is supported by the second bearing support frame.

In a preferred embodiment of the present invention, directional control valve means (106A, 106B, 106C, 106D) for controlling the supply of fluid to the first fluid-operated speed change mechanism (23) and to the fluid-actuated clutches (75, 76, 77) of the second fluid-operated speed change mechanism (24) are disposed in a valve block (102) which is secured to an outer surface of a side wall of the vehicle body (2) at a location generally between the first and second bearing support frames (40, 41) as viewed in a longitudinal direction of the vehicle body. The directional control valve means of this arrangement are concentratedly arranged in the valve block and are located near the rotary joints (94, 95) so as to shorten the piping therebetween.

In a further preferred embodiment, the side wall of the vehicle body (2) includes at least one opening (113; 113, 205) covered by the valve block (102), and conduit members (114A, 114B, 114C; 114A, 114B, 114C, 119A, 119B, 119C) for conducting fluid to at least one of the first and second rotary joint portions (94, 95) are bridged between the valve block (102) and at least one of the first and second bearing support frames (40, 41). According to this embodiment, the conduit members can be supported in advance by the first and/or second bearing support frame or frames by passing them through the opening or openings and, then, can be supported by the valve block at a same time when the valve block is attached to the side wall of the vehicle body.

Preferably, a fluid pressure-controlling valve (107) for controlling fluid pressure applied to the fluid-actuated clutches (63, 64, 65, 75, 76, 77) in response to a displacement of the directional control valve means (106A, 106B, 106C, 106D) is disposed in the valve block (102). The fluid pressure-controlling valve, which is provided at a location near the fluid-actuated clutches, operates to control fluid pressure in a precise manner because fluid pressure controlled by the valve is subjected to little influence of flow resistivity in the piping.

Although the first drive shaft (21) of first fluid-operated speed change mechanism and the second driven shaft (27) of second fluid-operated speed change mechanism will rotate at speeds different from each other, these shafts are arranged approximately co-axially with each other with end faces thereof being in a face-to-face relationship within the second bearing support frame (41). Thus, in a preferred embodiment of the present invention, the first drive shaft (21) includes in it a first lubricant passage (92L) for supplying lubricant to frictional elements of the fluid-actuated clutches (63, 64, 65) on the first drive shaft (21) whereas the second driven shaft (27) includes in it a second lubricant passage (93L) for supplying lubricant to frictional elements of the fluid-actuated clutches (75, 76, 77) on the second driven shaft (27), and the first and second lubricant passages (92L, 93L) are communicated to each other within the second bearing support frame (41). Further, one of the first and second bearing support frames (40, 41) includes in it a lubricant supply passage (96) which is communicated to said first and second lubricant passages (92L, 93L). Thus, lubricant supply structure for the clutches of both of the first and second fluid-operated speed change mechanisms is simplified.

In using a drive transmission assembly, a rough range of the vehicle speed is preferably determined in advance by a mechanical speed change mechanism and, during the vehicle is running, the control of vehicle speed is preferably carried out by an easily operable fluid-operated speed change mechanism. Thus, in a preferred embodiment of the present invention, a mechanical speed change mechanism (25) is disposed between the second driven shaft (27) and a propeller shaft (29) which is arranged co-axially with the second driven shaft. The mechanical speed change mechanism (25) includes a counter shaft (28), which is arranged in parallel with the propeller shaft (29) and is connected co-rotatably to the second driven shaft (27), and is operable to perform a speed change transmission including one change ratio, in which the propeller shaft (29) is directly connected to the second driven shaft (27), and at least one change ratio in which the propeller shaft (29) is connected to the second driven shaft (27) through the counter shaft (28).

In a further preferred embodiment, the vehicle body (2) comprises a first body housing (3), which has an open rear end and includes therein the direction-reversing mechanism (20) and the first fluid-operated speed change mechanism (23), and a second body housing (4) which has an open front end, an intermediate support wall (4a) and an open rear end and includes therein the second fluid-operated speed change mechanism (24) and the mechanical speed change mechanism (25). The second body housing is secured to the first body housing. The intermediate support wall (4a) of the second body housing supports rear end portions of the second drive and driven shafts (26, 27) and front end portions of the counter shaft (28) and propeller shaft (29). A first bearing support frame (40) is disposed within the vehicle body (2) and is fixedly attached to the first body housing (3), and supports rear end portions of the primary shaft and output shaft (17, 19) and front end portions of the first drive and driven shafts (21, 22). Further, a second bearing support frame (41) is disposed within the vehicle body (2) and is fixedly attached to one of the first and second body housings (3, 4), and supports rear end portions of the first drive and driven shafts (21, 22) and front end portions of the second drive and driven shafts (26, 27). According to this structure, the second fluid-operated speed change mechanism can be assembled into the second body housing from the front end opening thereof with rear end portions of the second drive and driven shafts (26, 27) being supported by the intermediate support wall (4a) whereas the mechanical speed change mechanism can be assembled into the second body housing from the rear end opening thereof with front end portions of the counter shaft (28) and propeller shaft (29) being supported by the intermediate support wall. The first and second bearing support frames can be used as described before in assembling the transmission assembly.

For an easier assembly, the output shaft (19) and the first drive shaft (21) are detachably coupled to each other by a first coupling.member (48a; 47a) which is disposed within the first bearing support frame (40), and the first driven shaft (22) and the second drive shaft (26) are detachably coupled to each other by a second coupling member (68) which is disposed within the second bearing support frame (41). In the embodiments which will be detailed later, a boss portion (48a; 47a) of a backward or forward directional gear mounted on the output shaft (19) of the direction-reversing mechanism is used as the first coupling member.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
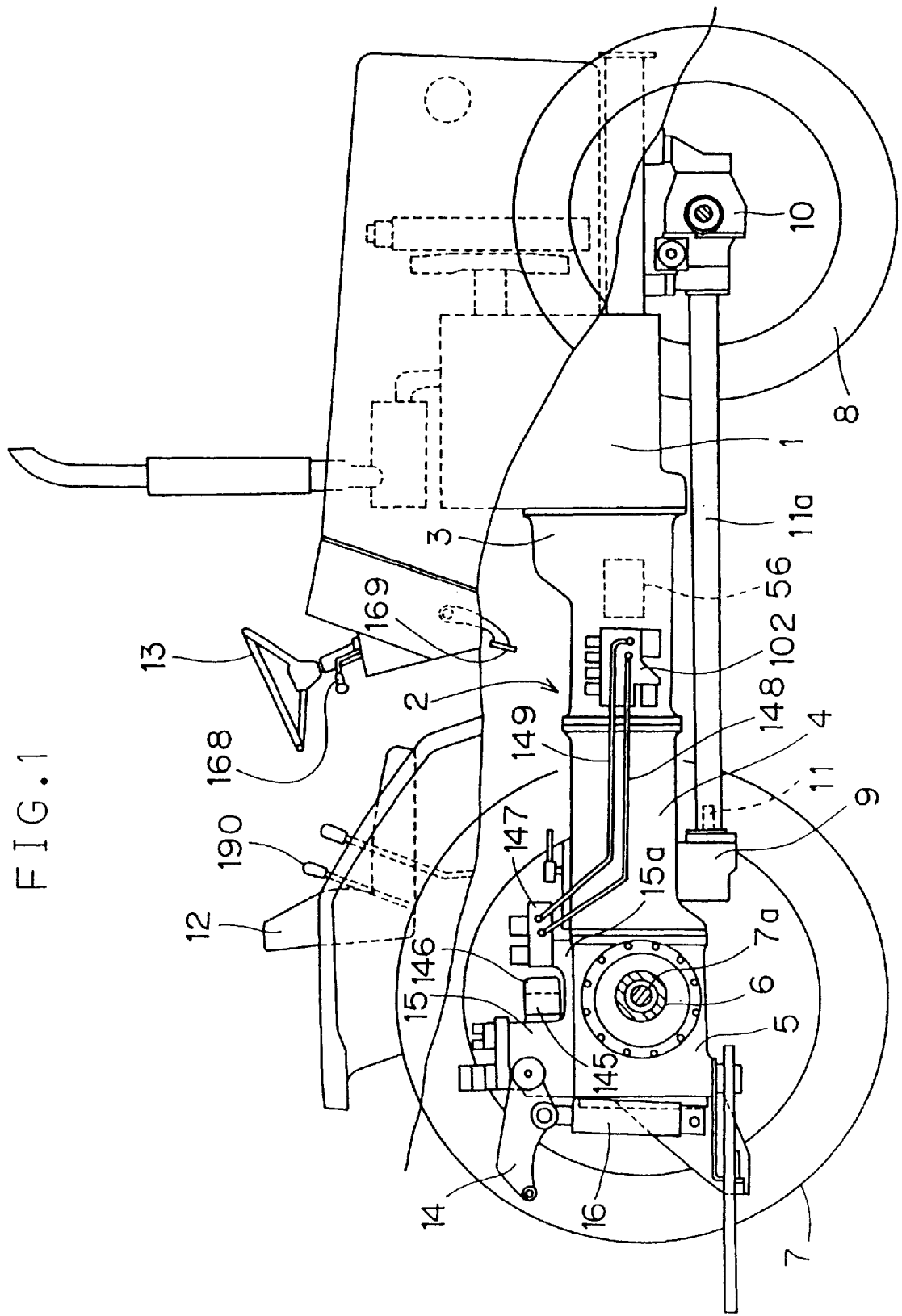
FIG. 1 is a side view, partially cut-away and partiall in section, of a tractor in which an embodiment of the drive transmission assembly according to the present invention is employed.

FIG. 1 shows a tractor in which a preferred enbodiment of the present invention is employed. Engine 1 as a drive source is mounted on a frontmost end of the vehicle body. The vehicle body 2 is composed of a first or front housing 3, second or middle housing 4 and third or rear housing 5 which are arranged in series in a longitudinal direction of the tractor and are fastened together. To left and right side surfaces of the rear housing 5, left and right rear axle housings 6 are secured. Left and right rear wheel axles 7a extend from the rear housing 5 through the left and right rear axle housings 6. The tractor shown is adapted to run by constantly driving the left and right rear wheels 7 and, if necessary, by additionally driving left and right front wheels 8. To a lower surface of the middle housing 4 is attached a front wheel drive case 9 from which a transmission shaft 11 extends forwardly into a tubular cover 11a for transmitting front wheel-driving power into a front axle casing 10.

Seat 12 is disposed at a location above the middle housing 4. At a location before the seat 12 is disposed a steering wheel 13 for operating left and right front wheels 8 to turn and to thereby steer the vehicle. A hydraulic lift case 15, having rotatable left and right lift arms 14, is mounted on an upper surface of the rear housing 5. Left and right hydraulic lift cylinders 16 for rotationally displacing these arms 14 are arranged at both sides behind the rear housing 5.

Figure 2:
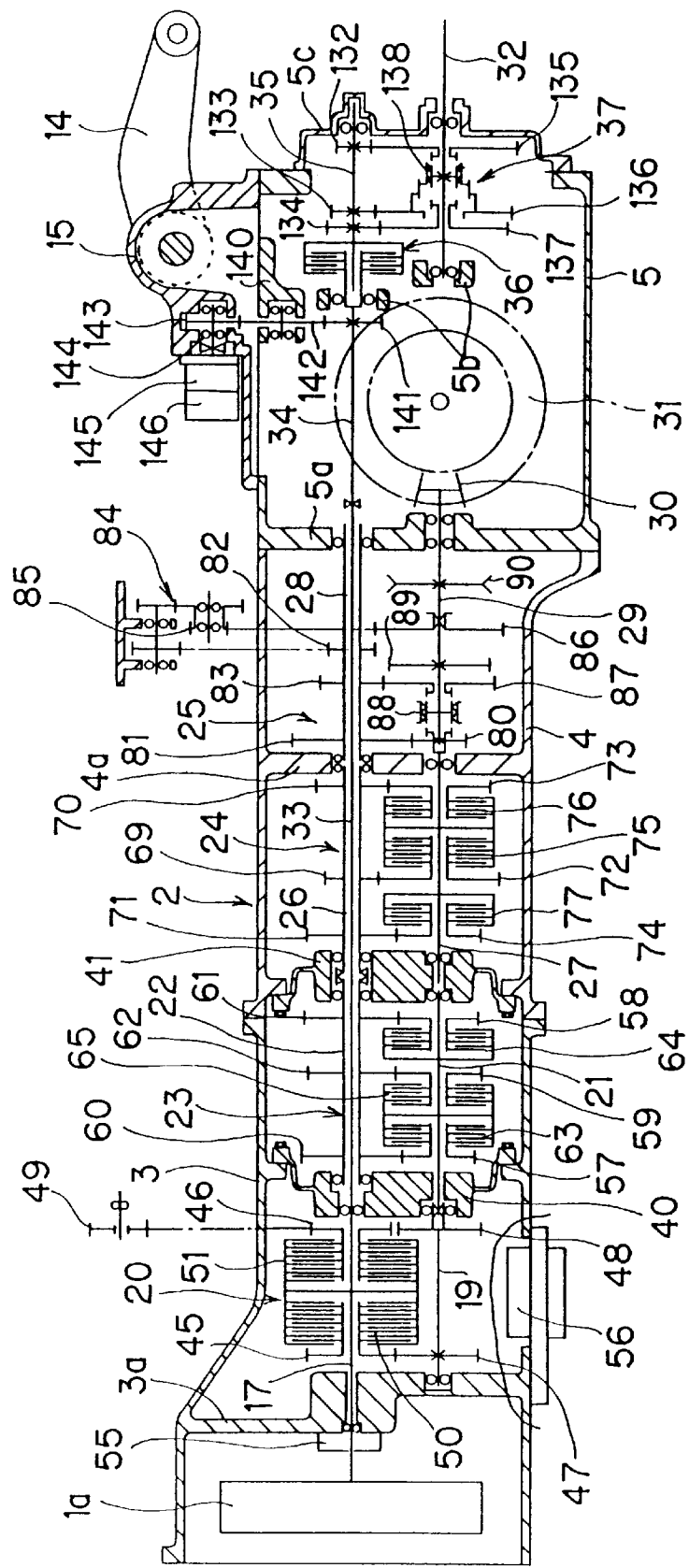
FIG. 2 is a schematic sectional side view, partially developed, showing the whole of the transmission assembly employed in the tractor shown in FIG. 1.
Figure 3:
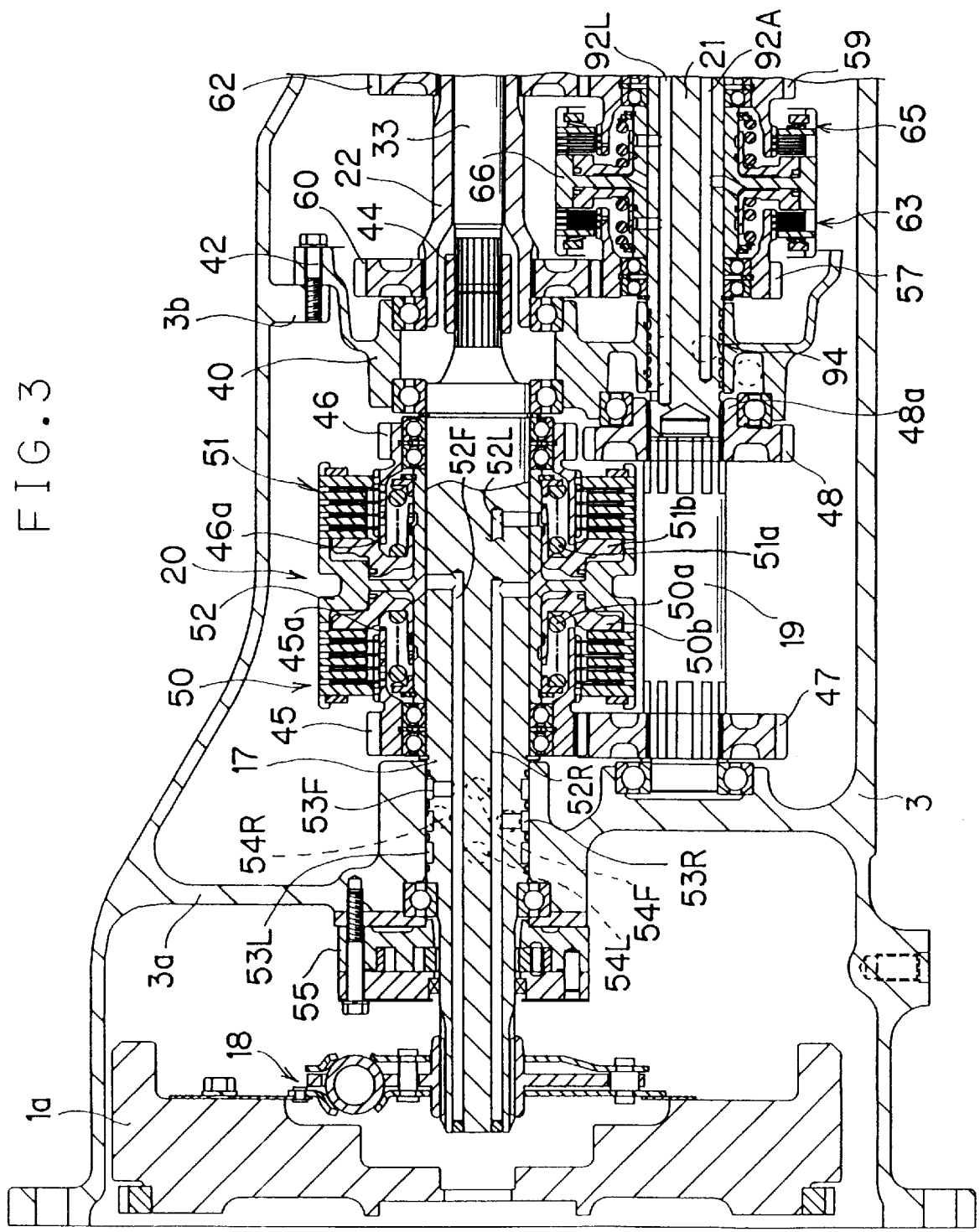
FIG. 3 is a sectional side view showing a front half of a front housing of the tractor shown in FIG. 1.

FIG. 2 shows the transmission system employed in the tractor. Front housing 3 includes, at a location near its front end, an integral support wall 3a. A primary drive shaft 17 extends through the support wall 3a, and it is connected, at a location before the support wall 3a, to an engine flywheel 1a through a shock-absorbing spring mechanism 18 (FIG. 3). Behind the support wall 3a, there are arranged within the front housing 3 a direction-reversing mechanism 20 and a first fluid-operated speed change mechanism 23. The direction-reversing mechanism 20 is disposed between the primary drive shaft 17 and an output shaft 19, arranged below the drive shaft 17, and is operable to change the direction of run of the tractor. The first fluid-operated speed change mechanism 23 is disposed between a drive shaft 21, disposed co-axially with and coupled to the output shaft 19, and a driven shaft 22, disposed co-axially with the primary drive shaft 17, and is operable to perform a speed transmission of multi-ratios between these shafts.

Middle housing 4 has an integral support wall 4a at its mid portion and includes a second fluid-operated speed change mechanism 24, located forwardly of the support wall 4a, and a mechanical speed change mechanism 25 located rearwardly of the support wall 4a. The second fluid-operated speed change mechanism 24 is disposed between a drive shaft 26, disposed co-axially with and coupled to the driven shaft 22 of the first fluid-operated speed change mechanism 23, and a driven shaft 27, disposed co-axially with the drive shaft 21 of the first fluid-operated speed change mechanism 23, and is operable to perform a speed change transmission of multi-ratios between these shafts. The mechanical speed change mechanism 25 comprises a counter shaft 28, disposed co-axially with the drive shaft 26 of the second fluid-operated speed change mechanism 24 and connected to the driven shaft 27 of this second change mechanism through a speed-reduction gearing, and a driven or propeller shaft 29, disposed co-axially with the driven shaft 27 of the second fluid operated speed change mechanism 24, and is operable to perform a speed change transmission of multi-ratios between the driven shaft 27 of the drive side and the propeller shaft 29.

Propeller shaft 29 extends into the rear housing 5 through a front wall 5a of this housing and has a bevel pinion 30 at its rear end. This bevel pinion 30 is meshed with a larger input bevel gear 31 of a differential gearing (not shown) for the left and right rear wheels 7.

Rear housing 5 includes, at its rearer location, an integral support wall 5b. A PTO (power take-off) shaft 32 is rotatably supported by the support wall 5b and by a rear end cover 5c, for closing a rear end opening of the housing 5, and extends rearwardly of the tractor. Each of the driven shaft 22 of the first fluid-operated speed change mechanism 23, drive shaft 26 of the second fluid-operated speed change mechanism 24 and counter shaft 28 of the mechanical speed change mechanism 25 is made hollow, and a transmission shaft 33, coupled at its front end to the primary drive shaft 17, extends through these hollow shafts 22, 26 and 28. This transmission shaft 33 is connected to the PTO shaft 32 through two transmission shafts 34 and 35, disposed co-axially with the transmission shaft 33, and a PTO clutch 36 disposed between the transmission shafts 34 and 35, and through a mechanical PTO speed change mechanism 37 disposed between the transmission shaft 35 and the PTO shaft 32.

Figure 4:
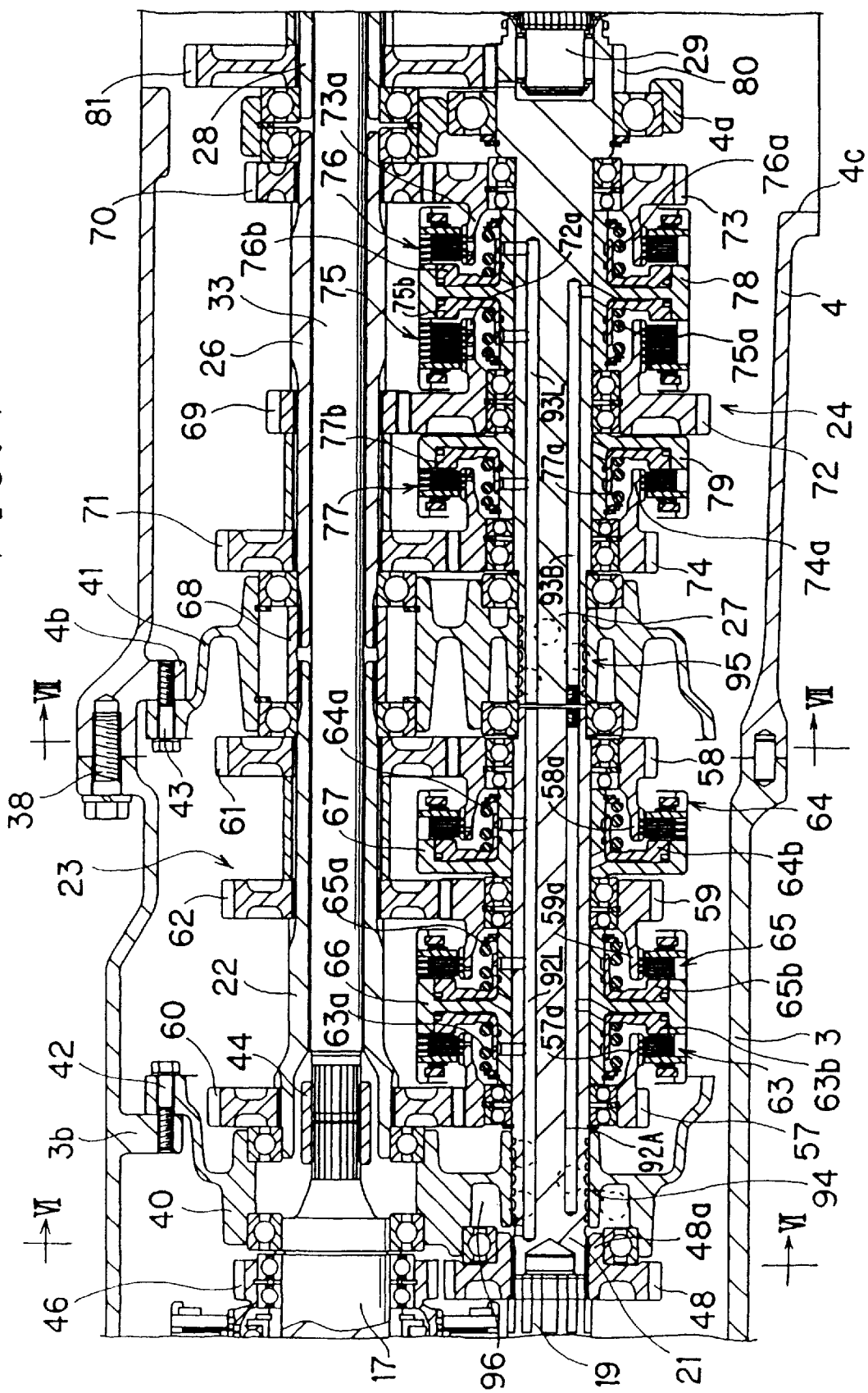
FIG. 4 is a sectional side view showing a rear half of the front housing and a front half of a middle housing of the tractor shown in FIG. 1.
Figure 5:
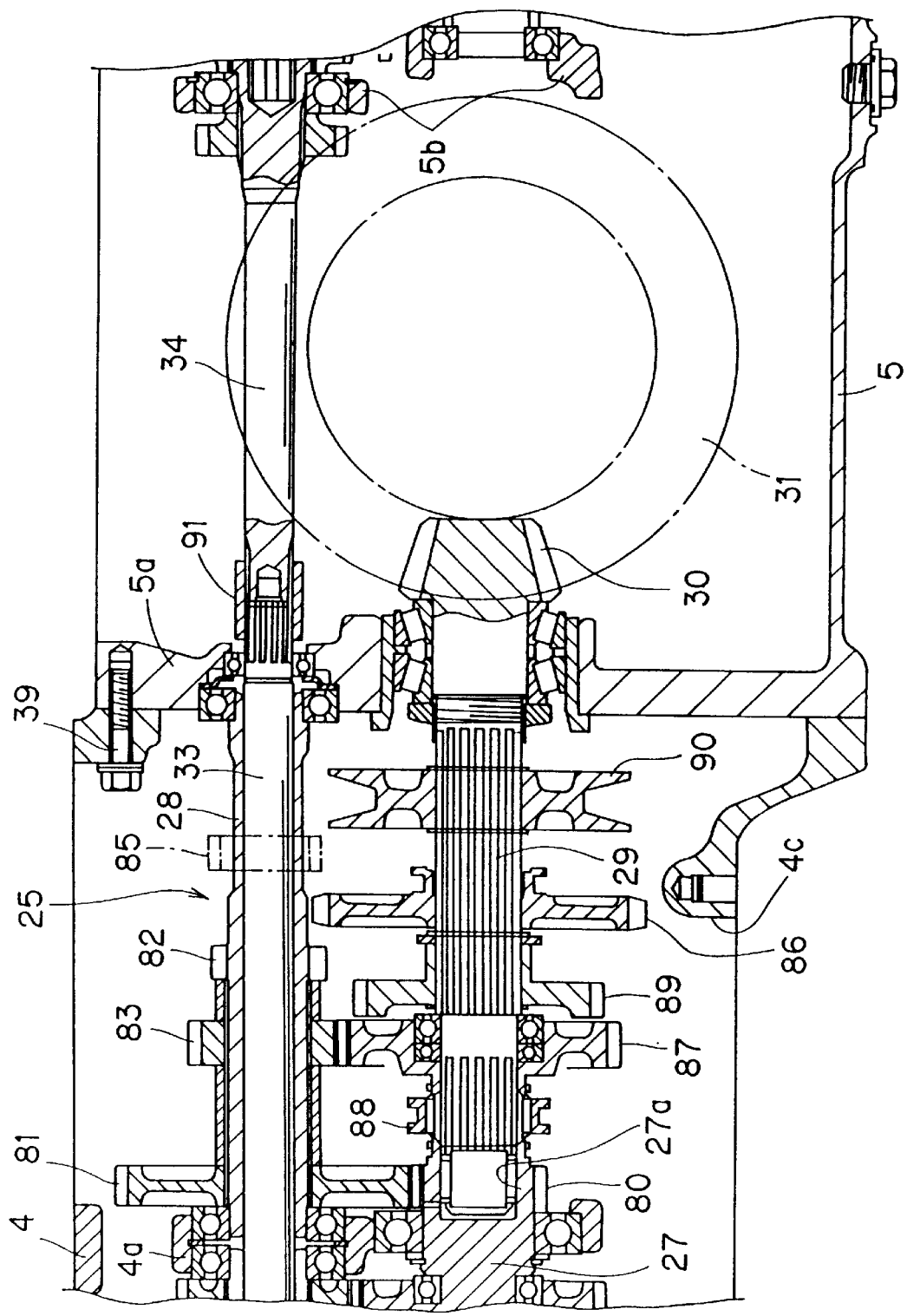
FIG. 5 is a sectional side view showing a rear half of the middle housing and a front half of a rear housing of the tractor shown in FIG. 1.

As shown in FIG. 2 and in FIGS. 4 and 5, the front housing 3 has an open rear end and the middle housing 4 has open front and rear ends. The front housing 3 is fastened to the middle housing 4 using bolts 38, and the middle housing 4 is fastened to the rear housing 5 using bolts 39. As shown in FIGS. 2 to 7, a first bearing support frame 40 is fixedly arranged within the front housing 3 at a location between the direction-reversing mechanism 20 and the first fluid-operated speed change mechanism 23, and a second bearing support frame 41 is fixedly arranged within the middle housing 4 at its frontmost end. The first bearing support frame 40 is secured to boss portions 3b, projecting inwardly from the inner surface of front housing 3, by bolts 42 from a rear side, and the second bearing support frame 41 is secured to boss portions 4b, projecting inwardly from the inner surface of middle housing 4, by bolts 43 from a front side. Each of the first and second bearing support frames 40 and 41 includes, at a center location along its horizontal width, upper and lower bearing support portions and has vertical and horizontal widths which are nearly equal to the corresponding inner sizes of each of the housings 3 and 4.

As best seen from FIG. 3, the primary drive shaft 17 is supported by the support wall 3a of the front housing 3 and by the first bearing support frame 40 and is coupled to the transmission shaft 33 by a coupling member 44 which is disposed within the first bearing support frame 40. The direction-reversing mechanism 20 comprises two gears 45 and 46, which are rotatably mounted on the primary drive shaft 17, and two gears 47 and 48 which are fixedly mounted on the output shaft 19. Of these gears, forward directional gears 45 and 47 are meshed directly. Backward directional gears 46 and 48 are meshed through an idler gear 49 (FIG. 2) which is supported by the bearing support frame 40. The output shaft 19 is supported, at its front end, by the support wall 3a and, at its rear end, by the first bearing support frame 40 through a boss portion 48a of the gear 48. The boss portion 48a is used as a coupling member for coupling between the output shaft 19 and the drive shaft 21 of first fluid-operated speed change mechanism 23.

Direction-reversing mechanism 20 is fashioned into a fluid-operated type and comprises a forward directional fluid-actuated clutch 50 and backward directional fluid-actuated clutch 51 which are disposed on the primary drive shaft 17 at a location between the gears 45 and 46. Each of the clutches 50 and 51 is fashioned into a well-known multi-disk type comprising alternately arranged first frictional elements and second frictional elements which are slidably but non-rotatably supported by a clutch cylinder 52, fixedly mounted on the primary drive shaft 17, and by a boss portion 45a, 46a of each gear 45, 46. A piston 50b, 51b, which is biased to move by a return spring 50a, 51a, is provided and is actuated by fluid pressure to engage the frictional elements or the clutch 50, 51. In the primary drive shaft 17, there are provided operating fluid passages 52F and 52R for supplying operating fluid to the fluid-actuated clutches 50 and 51 and a lubricant passage 52L for supplying lubricant to the frictional elements of clutches 50 and 51. These fluid passages 52F, 52R and 52L are communicated to annular fluid chambers 53F, 53R and 53L which are formed between the primary drive shaft 17 and support wall 3a by closing the open ends of annular grooves in the outer circumference of the primary drive shaft 17 by means of inner surface of the support wall 3a. The annular fluid chambers 53F, 53R and 53L provide rotary joints of fluid passages for communicating the fluid passages 52F, 52R and 52L in the rotating shaft 17 to fluid passages 54F, 54R and 54L which are provided within the support wall 3a and are fixed in position.

Fluid pump 55 for supplying fluid to the fluid-actuated clutches 50 and 51 is fashioned into an internal gear type, for which the primary drive shaft 17 is used as its pump shaft, and is mounted on a front surface of the support wall 3a. Control valve assembly 56 (FIGS. 1 and 2) for the direction-reversing mechanism 20 extends through an opening of a side wall of the front housing 3 and it is supported by this housing. Although not shown in the drawings, the support wall 3a includes fluid passages for communicating between the fluid pump 55 and control valve assembly 56 and the fluid passages 54F, 54R and 54L for communicating between the control valve assembly 56 and annular fluid chambers 53F, 53R and 53L. Embodical structures of these fluid passages as well as embodical structure of the control valve assembly 56 are described in U.S. Pat. No. 5,599,247 issued to the inventor of the present application.

As best seen from FIG. 4, the drive shaft 21 of first fluid-operated speed change mechanism 23 is supported, at its front end, by the first bearing support frame 40 and is coupled to the output shaft 19 of direction-reversing mechanism 20 using a boss portion 48a of the gear 48 as a coupling member, and is supported, at its rear end, by the second bearing support frame 41. Driven shaft 22 of this change mechanism 23 is supported, at its both ends, by the first and second bearing support frames 40 and 41. Three gears 57, 58 and 59 are rotatably mounted on the drive shaft 21, and three gears 60, 61 and 62 are fixedly mounted on the driven shaft 22. Corresponding gears on the drive shaft 21 and on the driven shaft 22 are meshed, respectively. Three fluid-actuated clutches 63, 64 and 65 are mounted on the drive shaft 21 for selectively coupling gears 57, 58 and 59 to the drive shaft. Each of these fluid-actuated clutches is fashioned into a well-known multi-disk type comprising alternately arranged first frictional elements and second frictional elements which are slidably but non-rotatably supported by a clutch cylinder 66, 67 (clutch cylinder 66 is common to the clutches 63 and 65) and by a boss portion 57a, 58a, 59a of each gear 57, 58, 59. A piston 63b, 64b, 65b, which is biased to move by a return spring 63a, 64a, 65a, is provided and is actuated by fluid pressure to engage the frictional elements or the clutch. The first fluid-operated speed change mechanism 23 provides a first change ratio transmission when the clutch 63 is engaged to thereby transmit power through gears 57 and 60, a second change ratio transmission when the clutch 64 is engaged to thereby transmit power through gears 58 and 61, and a third change ratio transmission when the clutch 65 is engaged to thereby transmit power through gears 59 and 62.

As also shown in FIG. 4, the drive shaft 26 of second fluid-operated speed change mechanism 24 is supported, at its front end, by the second bearing support frame 41 and is coupled to the driven shaft 22 of first fluid-operated speed change mechanism 23 through a coupling member 68 located within the second bearing support frame 41, and is supported, at its rear end, by the support wall 4a of middle housing 4. Driven shaft 27 of this change mechanism 24 is supported, at its both ends, by the second bearing support frame 41 and by the support wall 4a. Three gears 69, 70 and 71 are fixedly mounted on the drive shaft 26, and three gears 72, 73 and 74 are rotatably mounted on the driven shaft 27. Corresponding gears on the drive shaft 26 and on the driven shaft 27 are meshed, respectively. Three fluid-actuated clutches 75, 76 and 77 are mounted on the driven shaft 27 for selectively coupling gears 72, 73 and 74 to the driven shaft. Each of these fluid-actuated clutches is fashioned into a well-known multi-disk type comprising alternately arranged first frictional elements and second frictional elements which are slidably but non-rotatably supported by a clutch cylinder 78, 79 (clutch cylinder 78 is common to the clutches 75 and 76) and by a boss portion 72a, 73a and 74a of each gear 72, 73, 74. A piston 75b, 76b, 77b, which is biased to move by a return spring 75a, 76a, 77a, is provided and is actuated by fluid pressure to engage the frictional elements or the clutch. The second fluid-operated speed change mechanism 24 provides a first change ratio transmission when the clutch 75 is engaged to thereby transmit power through gears 69 and 72, a second change ratio transmission when the clutch 76 is engaged to thereby transmit power through gears 70 and 73, and a third change ratio transmission when the clutch 77 is engaged to thereby transmit power through gears 71 and 74.

As best seen from FIG. 5, the counter shaft 28 of mechanical speed change mechanism 24 is supported, at its front and rear ends, by the support wall 4a of middle housing 4 and by the front wall 5a of rear housing 5. The propeller shaft 29 is received, at its front end, by a bearing-receiving bore 27a, formed in a rear end of the driven shaft 27 of second fluid-operated speed change mechanism 24, so that it is supported by the support wall 4a through the driven shaft 27, and is supported, at its rear end, by the front wall 5a. The counter shaft 28 is connected to the driven shaft 27 of second fluid-operated speed change mechanism 24 through meshing reduction gears 80 and 81. Another two gears 82 and 83 are fixedly mounted on the counter shaft 28, and a gear 85, which is connected to the gear 82 through a speed-reducing gearing 84 shown in FIG. 2, is arranged at a location outside the counter shaft 28. The gearing 84 is fashioned into a cassette type which is inserted into the middle housing 4 through an opening in a side wall of this housing and is supported by the housing 4. On the propeller shaft 29, a shifter gear 86 selectively meshable with gear 85 is slidably but non-rotatably mounted and a gear 87 meshing with gear 83 is rotatably mounted. Further, a clutch member 88 is slidably but non-rotatably mounted and is slidable from its neutral position selectively to an operative position, where it couples the gear 87 to the propeller shaft 29, and to another operative position where it couples the propeller shaft 29 to the driven shaft 27 of second fluid-operated speed change mechanism 24. The mechanical speed change mechanism 25 provides a first or creep change ratio transmission when the shifter gear 86 is meshed with gear 85, a second change ratio transmission when the clutch member 88 is shifted to couple gear 87 to the propeller shaft 29, and a third change ratio transmission when the clutch member 88 is shifted to couple the propeller shaft 29 to the driven shaft 27 of second fluid-operated speed change mechanism 24.

In FIG. 5, numeral 89 designates a gear fixedly mounted on the propeller shaft 29 for taking-off front wheel-driving power, and numeral 4c designates an opening in a bottom wall of the middle housing 4 for passing a gear transmission mechanism (not shown) which is employed for transmitting front wheel-driving power from the gear 89 into the front wheel drive case 9 (FIG. 1). Numeral 90 designates a pulley fixedly mounted on the propeller shaft 29 for use as a member to be braked by a parking brake (not shown), and numeral 91 designates a coupling member for coupling between the transmission shafts 33 and 34 of the PTO drive line.

Figure 6:
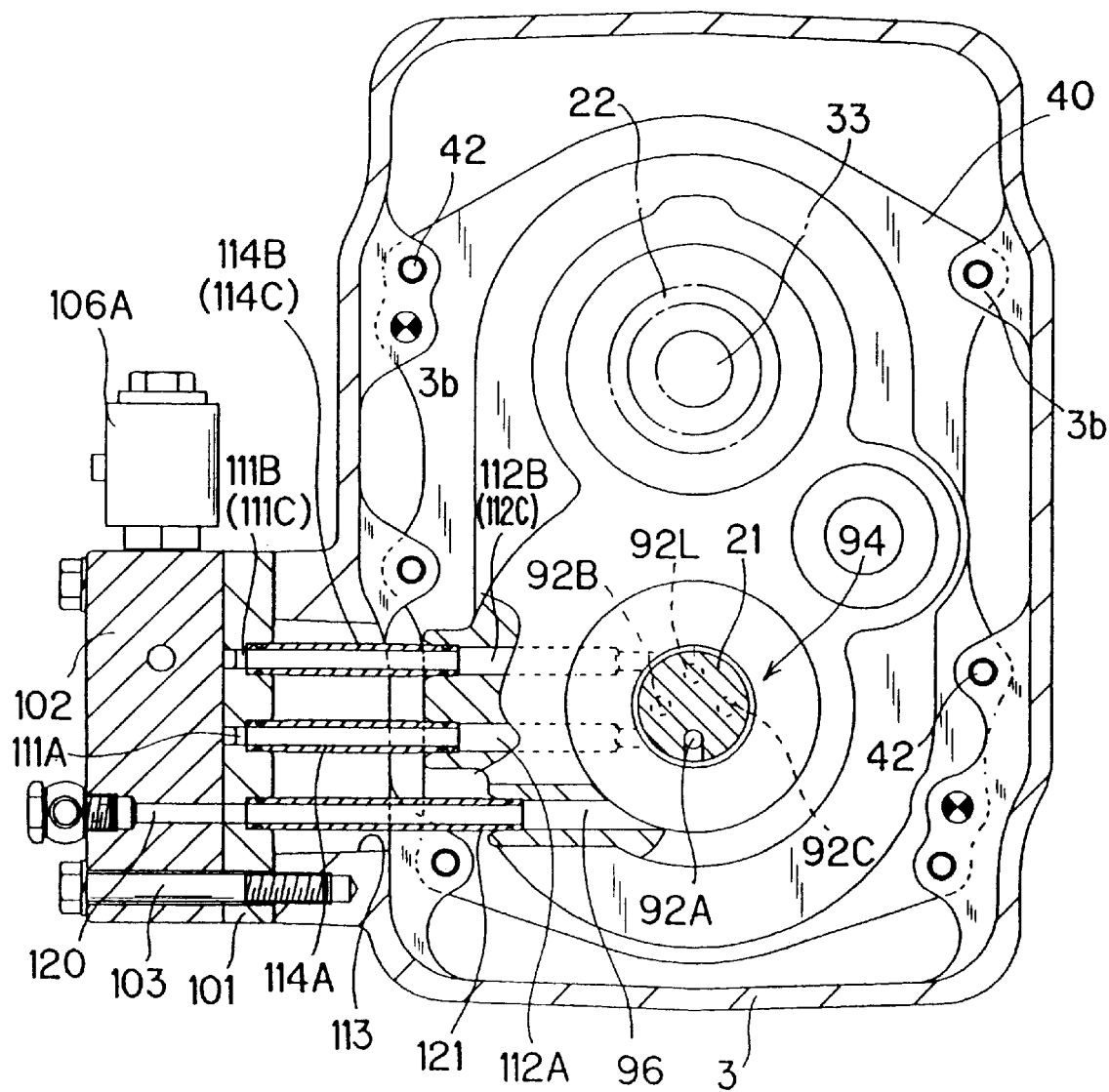
FIG. 6 is a sectional view taken generally along line VI—VI of FIG. 4.
Figure 7:
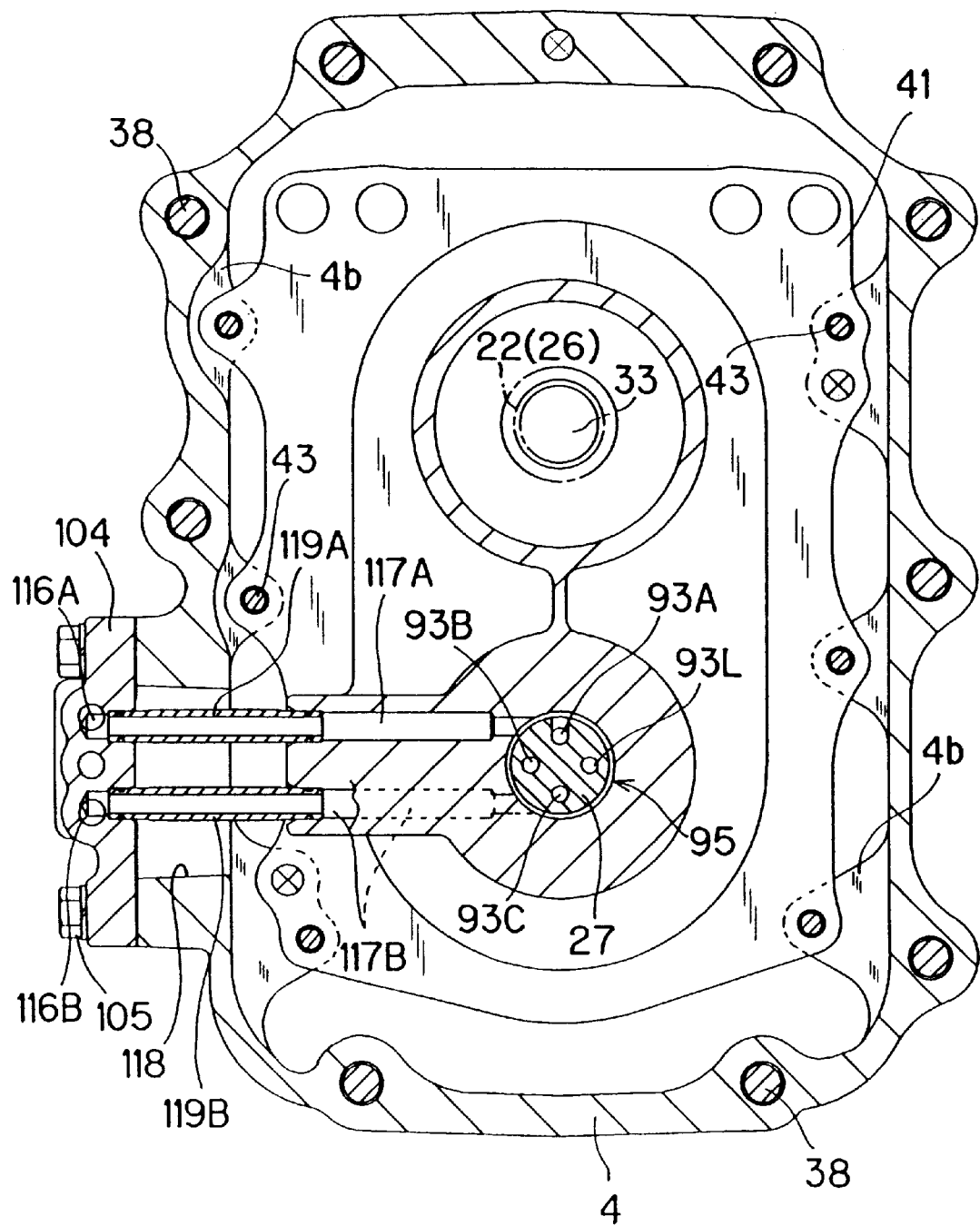
FIG. 7 is a sectional view taken generally along line VII—VII of FIG. 4.
Figure 8:
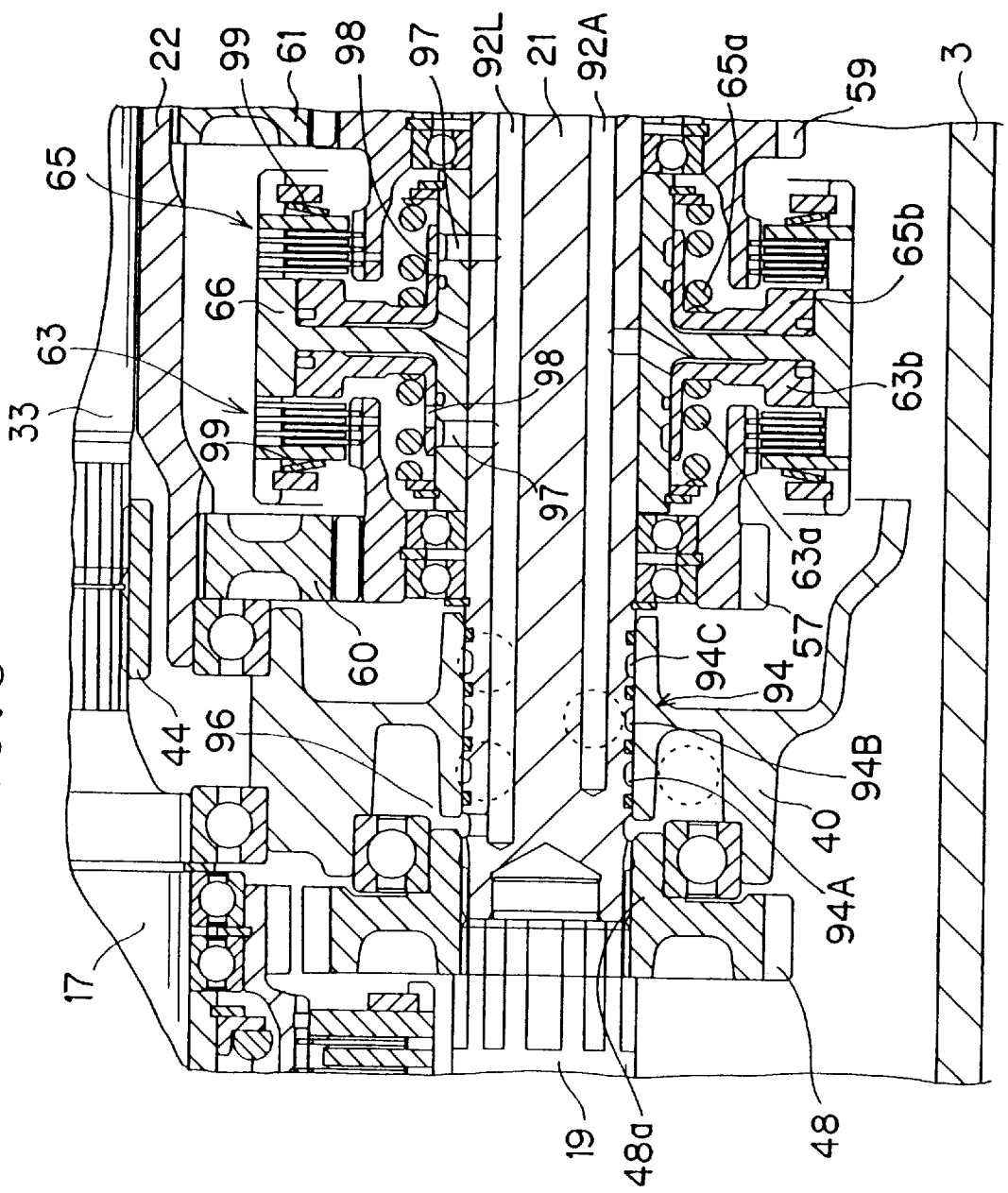
FIG. 8 is an enlarged sectional side view of a part of FIG. 4.

As shown in FIGS. 4 and 6 and in FIG. 8 which is an enlarged view of a part of FIG. 4, the drive shaft 21 includes in it fluid passages 92A, 92B and 92C for supplying operating fluid to the fluid-actuated clutches 63, 64 and 65 on the shaft 21, and a lubricant passage 92L for supplying lubricant to the frictional elements of these clutches. As shown in FIGS. 4 and 7 and in FIG. 9 which is an enlarged view of another part of FIG. 4, the driven shaft 27 includes in it fluid passages 93A, 93B and 93C for supplying operating fluid to the fluid-actuated clutches 75, 76 and 77 on the shaft 27, and a lubricant passage 93L for supplying lubricant to the frictional elements of these clutches. Rotary joint portions 94 for connecting the fluid passages 92A, 92B and 92C in the drive shaft 21 to stationary fluid passages are provided between the shaft 21 and the first bearing support frame 40, and rotary joint portions 95 for connecting the fluid passages 93A, 93B and 93C in the driven shaft 27 to stationary fluid passages are provided between the shaft 27 and the second bearing support frame 41. The former rotary joints 94 are formed by sealingly closing the open ends of annular grooves in an outer circumference of the drive shaft 21 by means of an inner surface of the first bearing support frame 40 so as to provide annular fluid chambers 94A, 94B and 94C, and the latter rotary joints 95 are formed by sealingly closing the open ends of annular grooves in an outer circumference of the driven shaft 27 by means of an inner surface of the driven shaft 27 so as to provide annular fluid chambers 95A, 95B and 95C. Lubricant passage 92L in the drive shaft 21 and lubricant passage 93L in the driven shaft 27 are communicated to each other through a clearance between the shafts 21 and 27 within the second bearing support frame 41, and a lubricant supply passage 96, which is communicated to the lubricant passage 92L in the drive shaft 21, is formed within the first bearing support frame 40.

Figure 9:
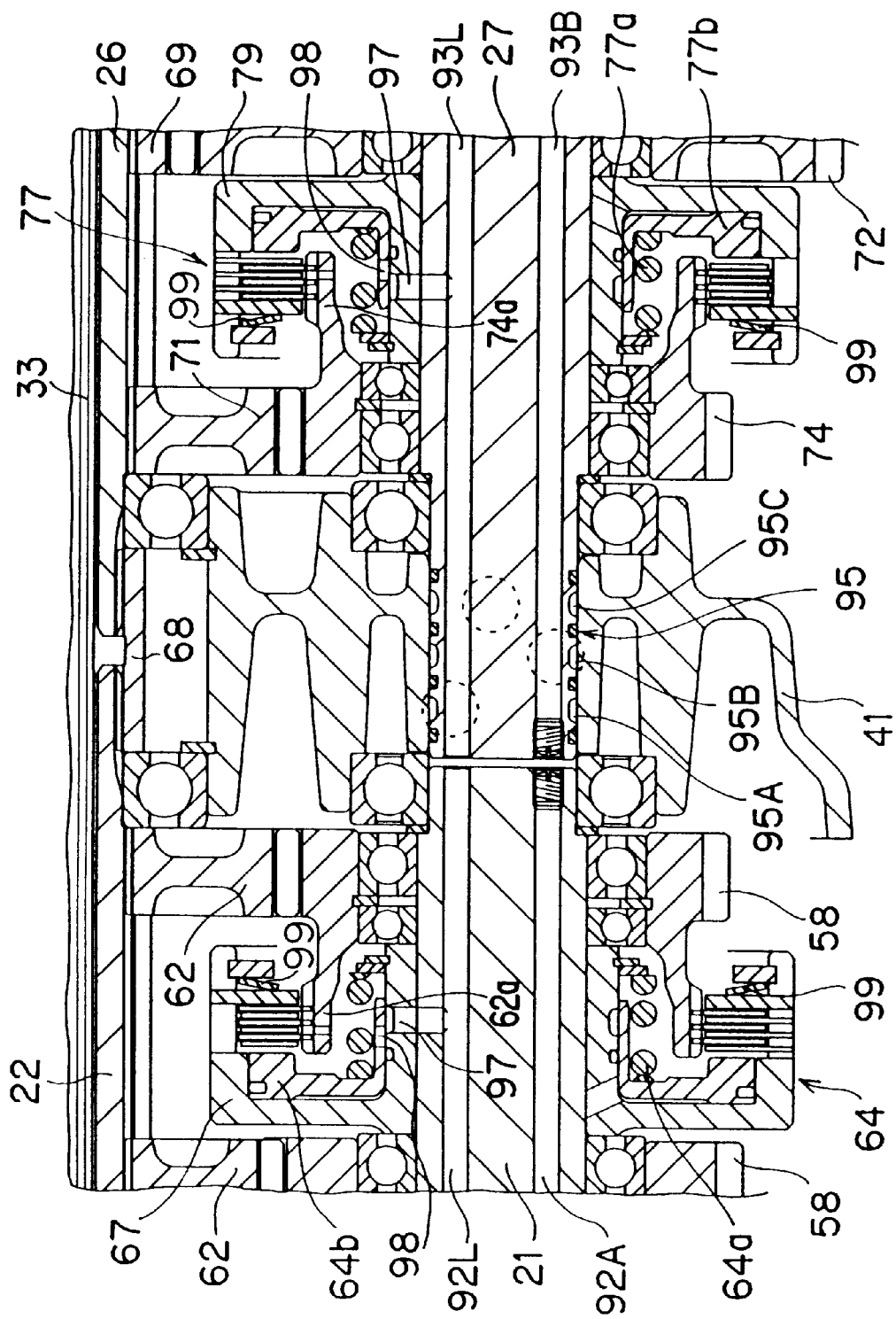
FIG. 9 is an enlarged sectional side view of another part of FIG. 4.

As shown in FIGS. 8 and 9, each of the pistons for the fluid-actuated clutches of first and second fluid-operated speed change mechanisms 23 and 24 includes a passage bore 98 for communicating the lubricant passage 92L, 93L to the frictional elements through a passage bore 97 in a boss portion of each clutch cylinder. These passage bores 97 and 98 are arranged such that the overlapping or communication area between these bores is largely throttled by the piston in the disengaged condition of each clutch whereas is enlarged in the clutch-engaged condition, where the piston is moved towards the frictional elements, so that lubricant is supplied sufficiently only to the clutch in the engaged condition. Each of the clutches includes a leaf spring 99 which is compressed when the clutch is engaged so as to attain a shock-free engagement of the clutch.

Figure 10:
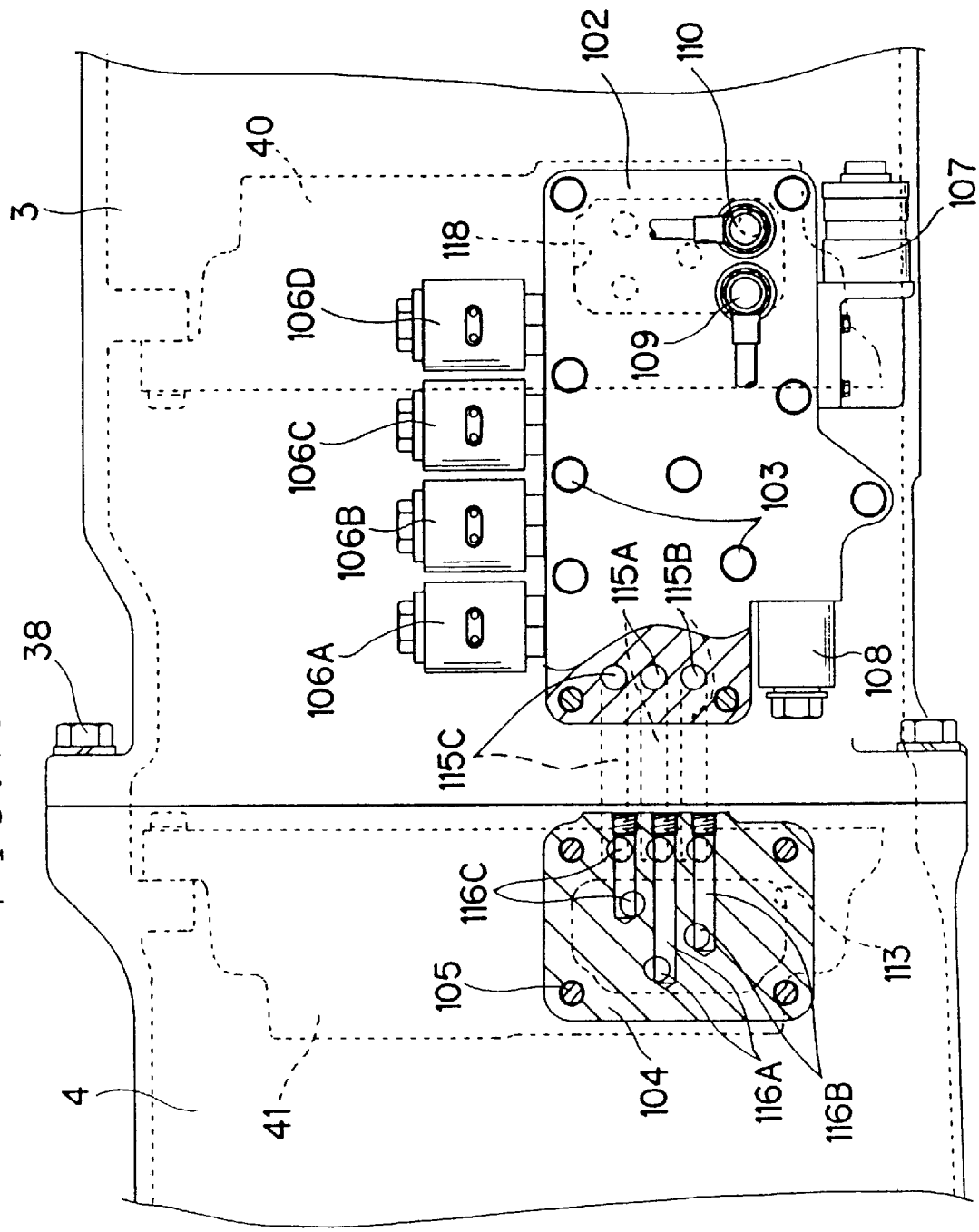
FIG. 10 is a side view, partially in section, showing a part of the tractor shown in FIG. 1.
Figure 11:
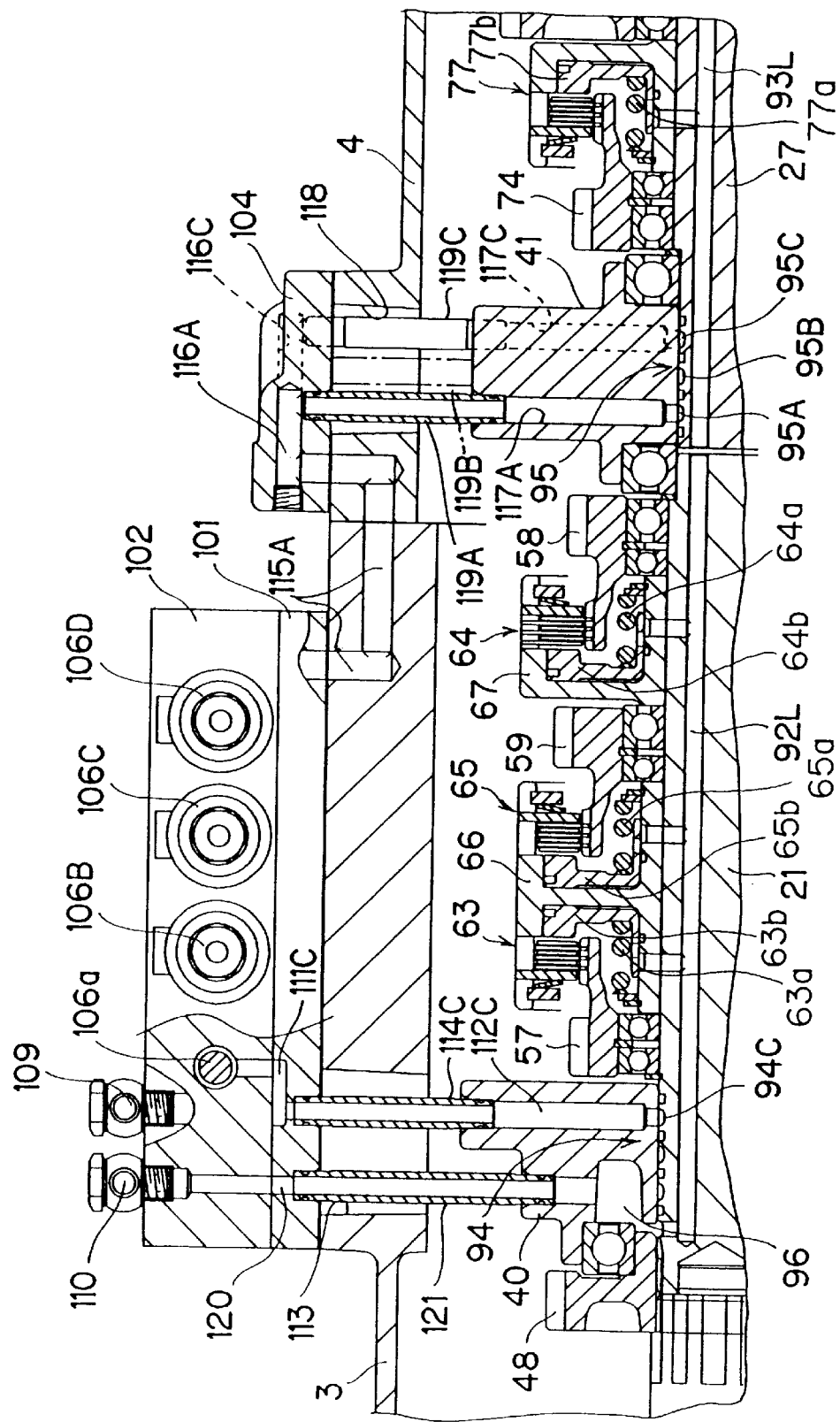
FIG. 11 is a sectional plane view showing a part of the tractor shown in FIG. 1.

As shown in FIGS. 6 and 7 and in FIGS. 10 and 11, a plate-shaped valve block 102 having a relatively large thickness is mounted on a lower portion of a right side wall of the front housing 3 through a plate member 101 and is secured to the side wall by bolts 103. This valve block 102 is arranged generally between the first and second bearing support frames 40 and 41, as viewed in the axial direction of the vehicle. Another plate member 104 is mounted on a lower and front end portion of a right side wall of the middle housing 4. On an upper surface of the valve block 102 are mounted four electromagnetic directional control valves 106A, 106B, 106C and 106D for controlling the supply of fluid to the fluid-actuated clutches 63, 64, 65, 75, 76 and 77 of the first and second fluid-operated speed change mechanisms 23 and 24. Fluid path-controlling plungers 106a of these electromagnetic valves extend into the valve block 102. An electromagnetic proportional valve 107 for controlling fluid pressure supplied to the clutches 63, 64, 65, 75, 76 and 77 is mounted on a front portion of a lower surface of the valve block 102, and an electromagnetic control valve 108 for controlling the drain of fluid from the clutches 63, 64, 65, 75, 76 and 77 is mounted on a lower portion of a rear surface of the valve block 102. Valve block 102 includes a fluid supply port 109 and a lubricant supply port 110.

Fluid passages 111A, 111B and 111C, which communicate with corresponding fluid passages in the valve block 102, are formed in the plate member 101, and fluid passages 112A, 112B and 112C, which communicate with the annular fluid chambers 94A, 94B and 94C, are formed in the first bearing support frame 40 such that these passages 112A, 112B and 112C are in face-to-face relationship with the passages 111A, 111B and 111C in the plate member 101. Three conduit members or pipes 114A, 114B and 114C extend through an opening 113 in the side wall of the front housing 3, which is closed by the plate member 101 and valve block 102, and are fitted, at one and the other ends thereof, into the fluid passages 111A, 111B and 111C and into the fluid passages 112A, 112B and 112C so as to connect therebetween. Further, fluid passages 115A, 115B and 115C which communicate, at one ends thereof, with corresponding fluid passages in the valve block 102 are formed in the plate member 101 and in the side wall of housing 3. These passages 115A, 115B and 115C communicate, at the other ends, with fluid passages 116A, 116B and 116C which are formed in the side wall of middle housing 4 and in the plate member 104 and which open at an inner surface of the plate member 104. Fluid passages 117A, 117B and 117C, which communicate with the annular fluid chambers 95A, 95B and 95C, are formed in the second bearing support frame 41 such that these passages 117A, 117B and 117C are in face-to-face relationship with the fluid passages 116A, 116B and 116C. Three conduit members or pipes 119A, 119B and 119C extend through an opening 118 in the side wall of middle housing 4, which is closed by the plate member 104, and are fitted, at one and the other ends thereof, into the fluid passages 116A, 116B and 116C and into the fluid passages 117A, 117B and 117C so as to connect therebetween.

Thus, flow direction of the fluid supplied to the fluid supply port 109 of valve block 102 is changed or controlled by the electromagnetic directional control valves 106A, 106B, 106C and 106D and this fluid is supplied into the annular fluid chamber 94A, 94B or 94C and into the annular fluid chamber 95A, 95B or 95C. On the other hand, the lubricant supply port 110 is connected to the lubricant supply passage 96 through a conduit member or pipe 121 connecting between a lubricant passage 120, which is formed in the plate member 101 so as to communicate with the lubricant port 110, and the lubricant supply passage 96. Thus, lubricant is constantly supplied into the lubricant passage 92L in the drive shaft 21 and into the lubricant passage 93L in the driven shaft 27.

Figure 12:
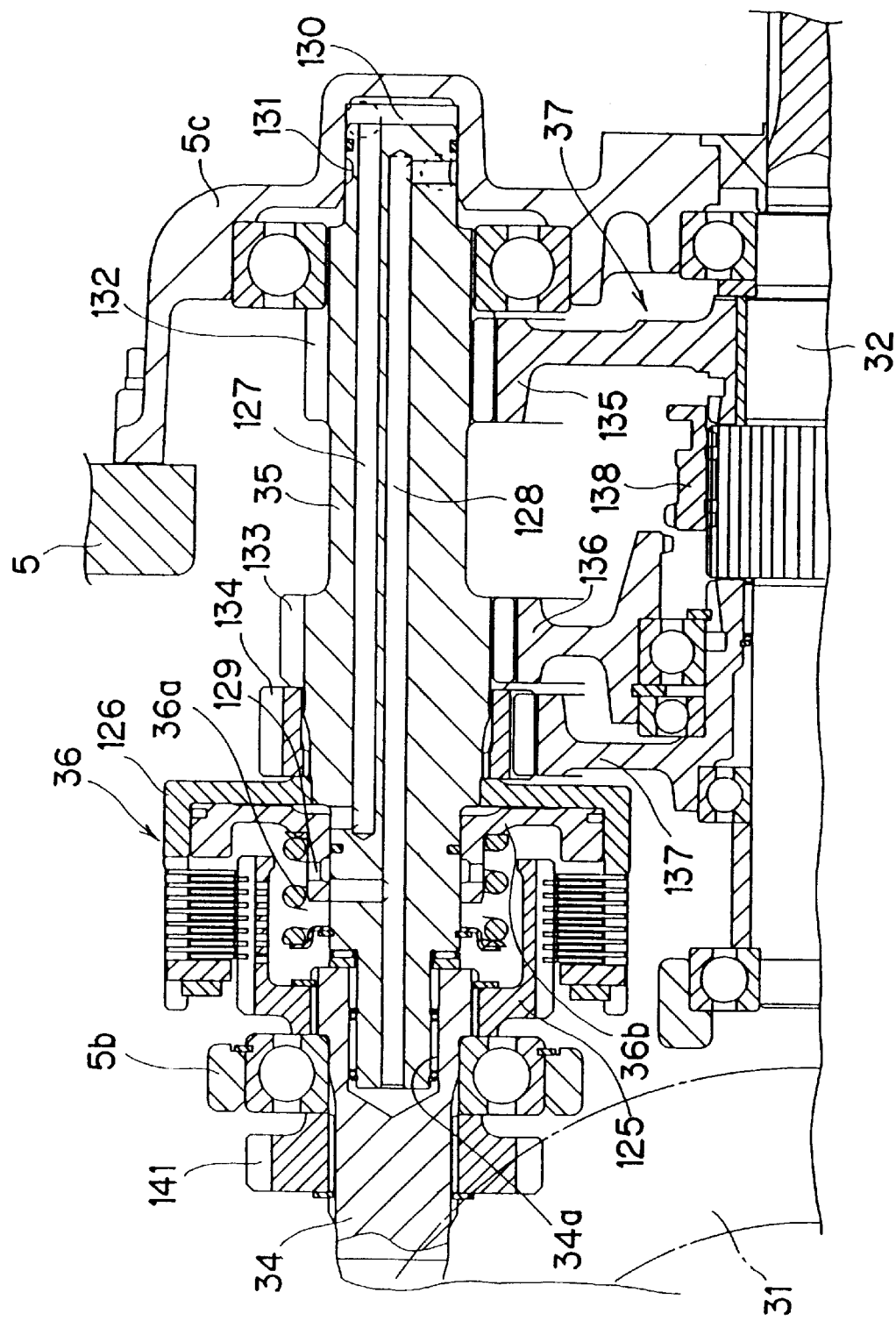
FIG. 12 is a sectional side view showing a rear and upper portion of the rear housing of the tractor shown in FIG. 1.

FIG. 12 shows an upper half of the inside of the rear housing 5. The PTO clutch 36 is fashioned into a fluid-actuated type comprising alternately arranged first frictional elements and second frictional elements which are slidably but non-rotatably supported by a rotatable support member 125, fixedly mounted on a rear end of the transmission shaft 34, and by a clutch cylinder 126 fixedly mounted on an front end portion of the transmission shaft 35. A piston 36b, which is biased to move by a return spring 36a, is provided such that the piston 36b is moved toward the frictional elements to engage the clutch by pressurized fluid supplied through a fluid passage 127 in the transmission shaft 35. A bearing-receiving bore 34a, which rotatably receives a front end of the transmission shaft 35, is formed in a rear end of the transmission shaft 34, and the transmission shaft 35 also includes a lubricant passage 128 for supplying lubricant to the frictional elements of the clutch 36 and to the bearing-receiving bore 34a. As in the fluid-actuated clutches of the first and second fluid-operated speed change mechanisms 23 and 24, piston 36b includes a passage bore 129 which throttles the supply of lubricant in the disengaged condition of clutch 36 and increases the supply of lubricant in the engaged condition of clutch 36. Fluid passage 127 is supplied with fluid from a fluid chamber 130 formed between an end face of the transmission shaft 35 and the rear end cover 5c, and lubricant passage 128 is supplied with lubricant from an annular fluid chamber 131 formed between an outer circumference of the transmission shaft 35 and the rear end cover 5c.

As shown in FIG. 12 and in FIG. 2, the PTO speed change mechanism 37 comprises three gears 132, 133 and 134, which are fixedly mounted on the transmission shaft 35, and three gears 135, 136 and 137 which are rotatably mounted on the PTO shaft 32 and are meshed with the corresponding gears 132, 133 and 134. A clutch member 138 is slidably but non-rotatably mounted on the PTO shaft 32 and is operable to selectively couple gears 135, 136 and 137 one at a time to the PTO shaft 32.

As shown in FIG. 2, the hydraulic lift case 15 is fixedly mounted on a top wall of the rear housing 5 so as to close an opening in the top wall. A support plate 140 supported by the lift case 15 is arranged at a high level within the rear housing 5. A gear 141 is fixedly mounted on a rear end portion of the transmission shaft 34 and is meshed with a gear 142 which is rotatably supported by the support plate 140. Another gear 143 is fixedly mounted on a power take-off shaft 144 supported by the lift case 15 and is meshed with the gear 142. On the front of lift case 15 are mounted two hydraulic pumps 145 and 146 which are driven by the power take-off shaft 144.

As shown in FIG. 1, a mounting plate 15a extends forwardly from the lift case 15 and a valve block 147 is mounted on the mounting plate 15a. Valves for controlling the supply of fluid to fluid-operated mechanisms of PTO drive line, including PTO clutch 36 connected to the hydraulic pump 145, which will be detailed later, are included in the valve block 147. A fluid supply pipe 148 and lubricant supply pipe 149 are connected, at their base ends, to the valve block 147 and, at their distal ends, to the fluid supply port 109 and lubricant supply port 110 of the valve block 102.

The method of assembly of the transmission shown will be detailed now. The direction-reversing mechanism 20 is assembled into a front location of the front housing 3 from the back of this housing 3, before the first bearing support frame 40 is attached, in such a condition that front end portions of the primary drive shaft 17 and output shaft 19 are supported by the support wall 3a. Then, the first bearing support frame 40 is attached and rear end portions of the primary drive shaft 17 and output shaft 19 are supported by the bearing support frame 40. The first fluid-operated speed change mechanism 23 is then assembled into a rear location of the front housing 3 from the back of this housing 3 in such a condition that front end portions of the drive shaft 21 and driven shaft 22 are supported by the first bearing support frame 40. The gear boss portion 48a, acting as a coupling member, connects between the output shaft 19 and drive shaft 21 at the same time when the first fluid-operated speed change mechanism 23 is assembled. The second fluid-operated speed change mechanism 24 is assembled into a front half of the middle housing 4 from the front of this housing 4, before the second bearing support frame 41 is attached, in such a condition that rear end portions of the drive shaft 26 and driven shaft 27 are supported by the support wall 4a. Then, the second bearing support frame 41 is attached and front end portions of the drive shaft 26 and driven shaft 27 are supported by the second bearing support frame 41. Hereupon, the front housing 3 is fastened to the middle housing 4 with rear ends of the drive shaft 21 and driven shaft 22 of first fluid-operated speed change mechanism 23 being supported by the second bearing support frame 41. The coupling member 68 has been attached in advance to the end of the driven shaft 22 or drive shaft 26, so that this coupling member 68 connects between the shafts 22 and 26 at the same time. The mechanical speed change mechanism 25 is assembled into a rear half of the middle housing 4 from the back of this housing 4 in such a condition that front end portions of the counter shaft 28 and propeller shaft 29 are supported by the support wall 4a. This assembly of the mechanical speed change mechanism 25 can be done either before or after the assembly of the second fluid-operated speed change mechanism 24. The PTO clutch 36 and PTO speed change mechanism 37 can be assembled into the rear housing 5 from the back of this housing 5 before the rear end cover 5c is attached. Prior to this assembly, the transmission shaft 33 of the PTO drive line is inserted into the hollow driven shaft 22, hollow drive shaft 26 and hollow counter shaft 28 from the back of these co-axially arranged shafts and can be coupled to the primary drive shaft 17 using the coupling member 44 which has been attached in advance to the end of primary drive shaft 17. The middle housing 4 is fastened to the rear housing 5 with rear ends of the counter shaft 28 and propeller shaft 29 being supported by the front wall 5a of rear housing 5.

As can be seen from FIGS. 6 and 11, pipes 114A, 114B, 114C and 121 can be inserted into the front housing 3 through the opening 113 and can be supported, at their one ends, by the first bearing support frame 40, and can be supported, at the other ends, by the plate member 101 when the plate member 101 and valve block 102 are attached to the front housing 3. As can be seen from FIGS. 7 and 11, pipes 119A, 119B and 119C can be inserted into the middle housing 4 through the opening 118 and can be supported, at their one ends, by the second bearing support frame 41, and can be supported, at the other ends, by the plate member 104 when this plate member 104 is attached to the middle housing 4. In respect to the power take-off mechanism for the hydraulic pumps 145 and 146 schematically shown in FIG. 2, gear 141 is previously mounted on the transmission shaft 34 and the support plate 140, supporting gear 142 and the power take-off shaft 144 having thereon gear 143, are previously supported by the lift case 15, and then the lift case 15 is mounted on an upper surface of the rear housing 5, so that the power take-off mechanism can be assembled at the same time when the lift case 15 is mounted.

Figure 13:
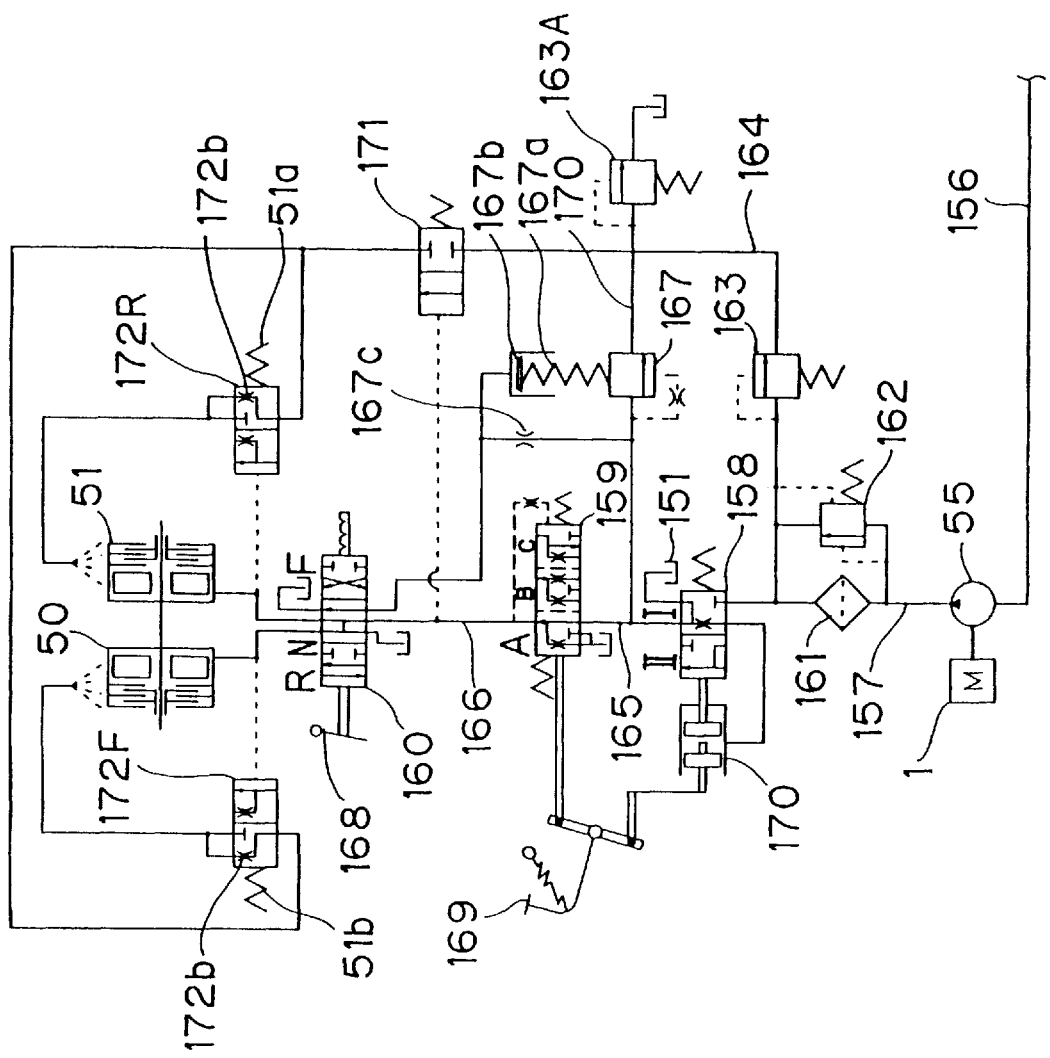
FIG. 13 is a circuit diagram showing a fluid circuit for a direction-reversing mechanism shown in FIGS. 2 and 3.
Figure 14:
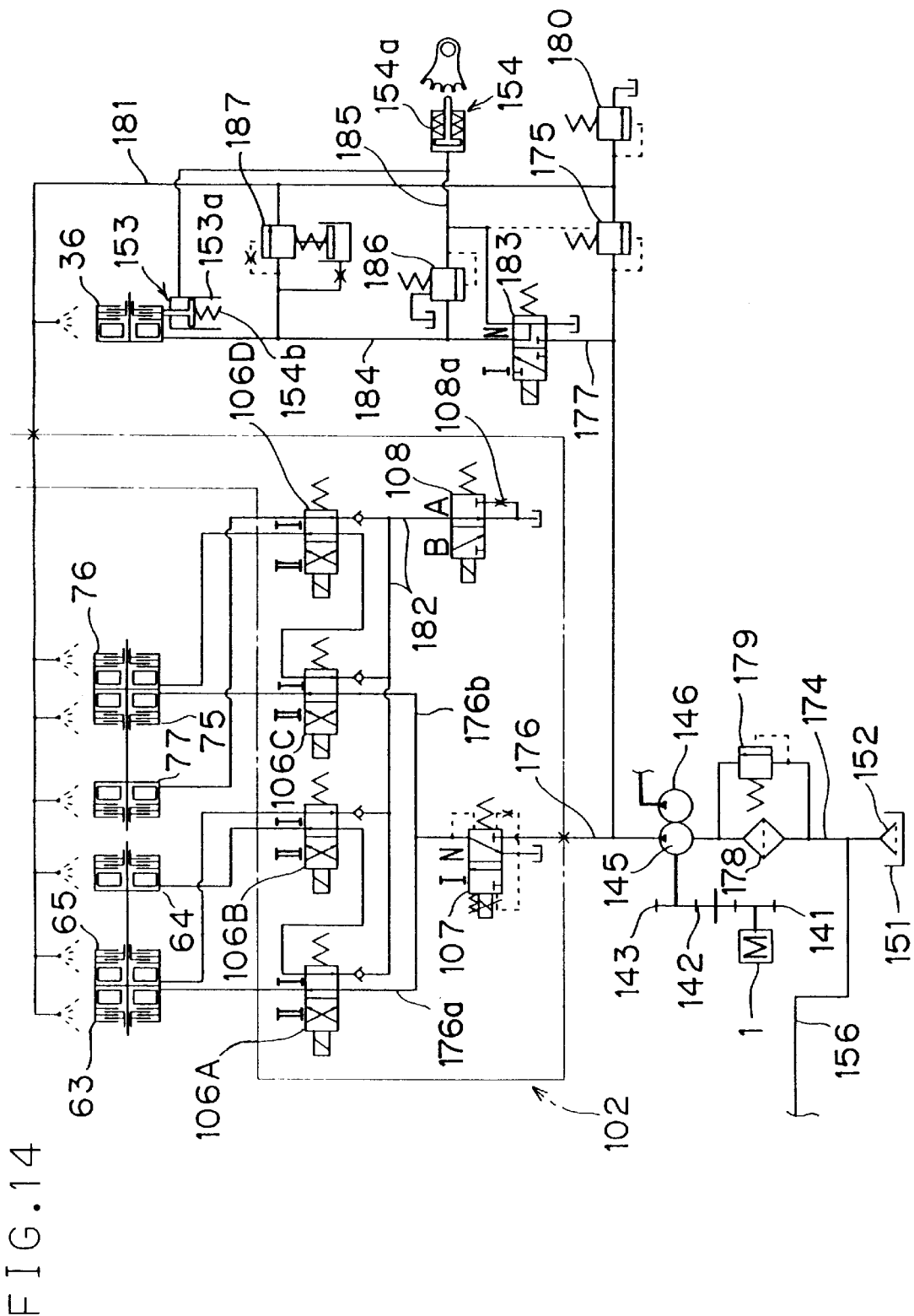
FIG. 14 is a circuit diagram showing a fluid circuit for first and second fluid-operated speed change mechanisms shown in FIGS. 2 and 4 and for a power take-off mechanism partly shown in FIGS. 2 and 12.

FIG. 13 and FIG. 14 show respectively a fluid circuit for the fluid-actuated clutches 50 and 51 of direction-reversing mechanism 20 and a fluid circuit for the fluid-actuated clutches 63, 64, 65, 75, 76 and 77 of first and second fluid-operated speed change mechanisms 23 and 24 and for fluid-actuated devices, including PTO clutch 36, of the power take-off drive line. Fluid is supplied from an oil reservoir 151, provided by a lower portion of the vehicle body 2, to the former fluid circuit by the pump 55 and to the latter circuit by the pump 145. The pump 146 is used for supplying fluid to the hydraulic lift cylinders 16 shown in FIG. 1. In the reservoir 151, a filter 152 common to the pumps 55, 145 and 146 is provided. The fluid-actuated devices of power take-off drive line include, other than the PTO clutch, a PTO brake 153 for braking the driven side of PTO clutch 36 when this clutch is in the disengaged condition, and a fluid-actuated interlocking mechanism 154 for keeping the clutch member 138 of PTO speed change mechanism 37 unmoved when the PTO clutch 36 is in the engaged condition.

As shown in FIG. 13, the fluid circuit for the fluid-actuated clutches 50 and 51 of direction-reversing mechanism 20 comprises a shut-off valve 158, pressure-reducing valve 159 and directional control valve 160 which are inserted in series in a fluid supply path 157 supplied with fluid from a fluid path 156 by the pump 55. A line fiter 161 and a bypass or relief valve 162, which are connected in parallel with each other, are incorporated in the fluid supply path 157. When the filter 161 is choked and fluid pressure in the upstream side thereof is hightened, the bypass valve 162 will perform a fluid-relieving operation so as to secure a required amount of fluid. Fluid pressure in the fluid supply path 157 is determined by a main relief valve 163, and a lubricant supply path 164 is connected to the downstream side of main relief valve 163 so as to supply lubricant at fluid pressure determined by a secondary relief valve 163A towards the fluid-actuated clutches 50 and 51.

The shut-off valve 158 has a shut-off position I, where it shuts off the fluid supply path 157, and an open position II where it connects the fluid supply path 157 to a connecting path 165 between the shut-off valve 158 and pressure-reducing valve 159. In the shut-off position I, the shut-off valve 159 connects the connecting path 165 to the reservoir 151 to drain fluid from the path 165. The pressure-reducing valve 159 is operable to reduce fluid pressure in a fluid path 166, which connects between the reducing valve 159 and directional control valve 160, and has a non-operative position A where the connecting path 165 is connected to the path 166 without any substantial reduction in fluid pressure, a pressure-reducing position B where a communicating path in the valve 157, connecting between the paths 165 and 166, is variably throttled so as to variably reduce fluid pressure in the fluid path 166, and a pressure-unloading position C where fluid is drained from the path 166 so as to unload fluid pressure in the path 166. The directional control valve 160 has a neutral position N where both of the fluid-actuated clutches 50 and 51 are disengaged, an operative position F where the forward directional fluid-actuated clutch 50 is engaged, and another operative position R where the backward directional fluid-actuated clutch 51 is engaged. To the connecting path 165 is connected a well-known modulating-type relief valve 167 comprising a pressure-determining spring 167*a* the base end of which is received by a control piston 167*b*. A fluid chamber behind the piston 167*b* is connected to the reservoir 151 through the directional control valve 160 such that fluid in the chamber is quickly drained in the neutral position N of the control valve 160. When the directional control valve 160 is displaced to the operative position F or R, the piston 167*b* is gradually advanced by fluid which gradually flows into the fluid chamber behind the piston from the path 165 through a throttle 167*c*. Thus, the relief valve 167 gradually increases fluid pressure in the connecting path 165 to a predetermined value. The directional control valve 160 is displaced by a control lever 168, shown in FIG. 1, which is arranged at a location near the steering wheel 13.

The pressure-reducing valve 159 is operated by a pedal 169 arranged at a front and lower location of the seat 12, as shown in FIG. 1, and a cylinder mechanism 170 is provided for mechanically displacing the shut-off valve 158 from the shut-off position I to the open position II in response to the operation of reducing valve 159. This cylinder mechanism 170 is structured such that, once the shut-off valve 158 is displaced to the open position II, it is kept in the open position II by fluid pressure in the connecting path 165, applied through the shut-off valve 158, even when the pedal 169 is returned to its original position. The pedal 169 is fully trodden down in a rest state of the vehicle to displace the reducing valve 159 to the pressure-unloading position C and, at the same time, to displace the shut-off valve 158 to the open position II. Then, the pedal 169 is gradually released so as to displace the reducing valve to the pressure-reducing position B and then to the non-operative position A, whereby the vehicle starts gradually in a shock-free manner. In a running state of the vehicle, the pedal 169 can be trodden down in an optional degree so as to attain an optional reduction in fluid pressure by the reducing valve 159, whereby an optional slipping engagement of the fluid-actuated clutch 50 or 51 can be attained so as to run the vehicle at an optional low speed.

Figure 15:
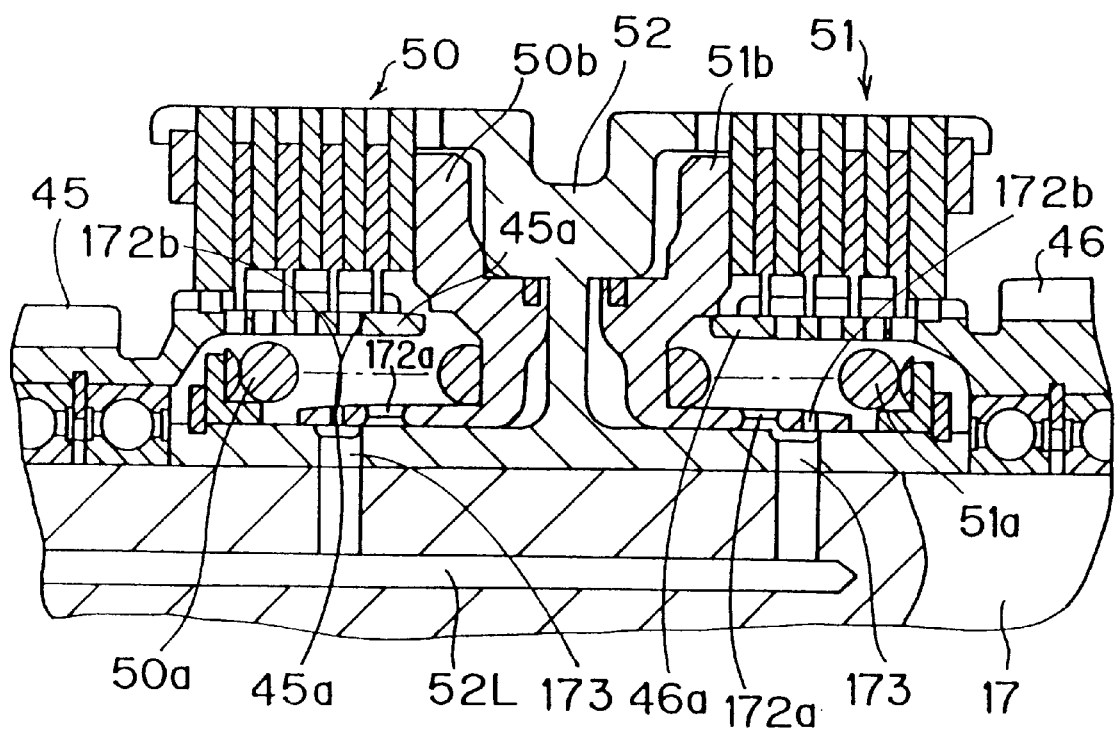
FIG. 15 is an enlarged sectional view showing a part of the direction-reversing mechanism shown in FIGS. 2 and 3.

As also shown in FIG. 13, a downstream path 170 of the modulating-type relief valve 167 is joined to the lubricant supply path 164. An on-off valve 171 is incorporated in the lubricant supply path 164. Fluid pressure in the path 166 is applied to the on-off valve 171 as pilot pressure, so that, only when fluid pressure is established in the path 166, the valve 171 is opened so as to supply lubricant towards the fluid-actuated clutches 50 and 51. At the downstream side of the on-off valve 171, the lubricant supply path 164 is connected to the forward directional clutch 50 and to the backward directional clutch 51, respectively, through a flow regulator valve 172F and through a flow regulator valve 172R. These flow regulator valves 172F and 172R are structured using the fluid-actuated clutches 50 and 51. As shown in FIG. 15, each piston 50*b*, 51*b* of each clutch 50, 51 includes, for conducting lubricant from the lubricant passage 52L in the primary drive shaft 17 to the frictional elements of each clutch 50, 51 through a passage bore 173 in the boss portion of clutch cylinder 52, axially spaced larger bore 172*a* and smaller bore 172*b*. These bores 172*a* and 172*b* are arranged such that only the smaller bore 172*b* is overlapped with the bore 173 in the disengaged condition of clutch, as shown with respect to the forward directional clutch 50, whereas both of the larger and smaller bores 172*a* and 172*b* are overlapped with the bore 173 in the engaged condition of clutch, as shown with respect to the backward directional clutch 51. Thus, lubricant is supplied sufficiently only to the clutch of the engaged condition.

The fluid circuit shown in FIG. 13 is substantially the same as the one disclosed in the aforementioned U.S. Pat. No. 5,599,247 which also describes embodical structures of the valves shown in FIG. 13.

Referring now to the fluid circuit shown in FIG. 14, a fluid path 174 is provided for supplying fluid by the operation of pump 145 to the fluid-actuated clutches 63, 64, 65, 75, 76 and 77 of the first and second fluid-operated speed change mechanims 23 and 24 through a fluid supply path 176 and to the PTO clutch 36, PTO brake 153 and interlocking mechanism 154 through a fluid supply path 177. Fluid pressure in the fluid supply paths 176 and 177 is determined by a main relief valve 175. A line filter 178 and a bypass or relief valve 179, which are connected in parallel with each other, are incorporated in the fluid path 174. The bypass valve 179 functions in the same manner as the bypass valve 162. A lubricant supply path 181 is connected to the downstream side of main relief valve 175 so as to supply lubricant at fluid pressure determined by a secondary relief valve 180 towards the PTO clutch 36 and towards the fluid-actuated clutches 63, 64, 65, 75, 76 and 77.

The electromagnetic proportional valve 107 is incorporated in the fluid supply path 176. The electromagnetic proportional valve 107 is operable in response to an electric signal so as to be displaced from a neutral position N, where fluid in the downstream side thereof is drained, to an operative position I where the proportional valve 107 controls the flow of fluid through the supply path 176 in response to the value of the electric signal so as to gradually increase fluid pressure in the downstream side. At the downstream side of proportional valve 107, the fluid supply path 176 is branched into two supply paths 176*a* and 176*b*. The supply path 176*a* is connected to the three fluid-actuated clutches 63, 64 and 65 of first fluid-operated speed change mechanism 23 through the two electromagnetic directional control valves 106A and 106B, whereas the supply path 176*b* is connected to the three fluid-actuated clutches 75, 76 and 77 of second fluid-operated speed change mechanism 24 through the two electromagnetic directional control valves 106C and 106D. To the electromagnetic directional control valves 106A, 106B, 106C and 106D, there is connected, via check valves, a single fluid drain path 182 in which the electromagnetic control valve 108 is incorporated for controlling the drain of fluid through the drain path 182. The electromagnetic control valve 108 has a position A in which fluid is drained to the reservoir 152 without any restriction of flow, and another position B to which it is displaced by the energization of solenoid and in which the flow of fluid drained is throttled by a throttle 108*a*.

Each of the electromagnetic directional control valves 106A, 106B, 106C and 106D is fashioned into a control valve of four ports and two positions having no neutral position and is displaced from position I to position II by the energization of solenoid. The fluid supply path 176*a* is connected to the directional control valve 106A, which is connected to the fluid-actuated clutch 63 and to the directional control valve 106B which is in turn connected to the fluid-actuated clutches 64 and 65. Similarly, the supply path 176b is connected to the directional control valve 106C, which is connected to the fluid-actuated clutch 75 and to the directional control valve 106D which is in turn connected to the fluid-actuated clutches 76 and 77. Table 1 shows the relationship between the positions of electromagnetic directional control valves 106A, 106B, 106C and 106D and two clutches in the engaged condition, namely one clutch of the first fluid-operated speed change mechanism 23 and one clutch of the second fluid-operated speed change mechanism 24.

TABLE 1

| Positions of the control valves | | | | change mechanism | change mechanism |
|---|---|---|---|---|---|
| 106A | 106B | 106C | 106D | 23 | 24 |
| I | I | I | I | clutch 63 | clutch 75 |
| I | I | II | I | | clutch 76 |
| I | I | II | II | | clutch 77 |
| II | I | I | I | clutch 64 | clutch 75 |
| II | I | II | I | | clutch 76 |
| II | I | II | II | | clutch 77 |
| II | II | I | I | clutch 65 | clutch 75 |
| II | II | II | I | | clutch 76 |
| II | II | II | II | | clutch 77 |

An electromagnetic directional control valve 183 is incorporated in the fluid supply path 177, and the downstream side of this valve 183 is connected via a fluid path 184 to the PTO clutch 36 and via a fluid path 185 to an actuating cylinder 154a of the interlocking mechanism 154 and to a disactuating cylinder 153a of the PTO brake 153. A relief valve 186 of a relatively low relief pressure is provided for determining fluid pressure in the fluid path 185 and relieved fluid of this relief valve 186 is joined to the fluid path 184 connected to the PTO clutch 36. A modulating-type relief valve 187 is provided for determining fluid pressure in the fluid path 184 and the relieved fluid of this relief valve 187 is joined to the lubricant supply path 181. The electromagnetic directional control valve 183 has a neutral position N where fluid in the fluid paths 184 and 185 is draind, and an operative position I where fluid is supplied to the fluid paths 184 and 185. In the neutral position N of directional control valve 183 where PTO clutch 36 is disengaged, PTO brake 153 is in its braking condition due to the biasing force of spring 153b and the interlocking mechanism 154 is in its non-operative condition. In the operative position I of directional control valve 183 where the valve 183 is displaced by the energization of solenoid to engage the PTO clutch 36 by fluid pressure determined by the modulating-type relief valve 187, fluid pressure determined by the relief valve 186 is applied to the cylinders 153a and 154a whereby PTO brake 153 is in its non-operative condition to allow free rotation of the driven side of PTO clutch 36 and the interlocking mechanism 154 is in its operative condition to keep the clutch member 138 of PTO speed change mechanism 37 shown in FIGS. 2 and 12 unmoved.

The lubricant supply path 181 supplies lubricant to the frictional elements of PTO clutch 36 through the lubricant passage 128 in the transmission shaft 35 shown in FIG. 12 and to the frictional elements of fluid-actuated clutches 63, 64, 65, 75, 76 and 77 through the lubricant passages 92L and 93L in the drive shaft 21 and driven shaft 27 shown in FIG. 4. Although lubricant is supplied to a plurality of the fluid-actuated clutches by a single supply system, it is designed by the arrangement of passage bores 97 and 98 shown in FIGS. 8 and 9 and by the arrangement of passage bores 129 shown in FIG. 12 that sufficient lubricant is supplied only to the clutches in the engaged condition, so that lack in the lubricant is not caused.

Figure 16:
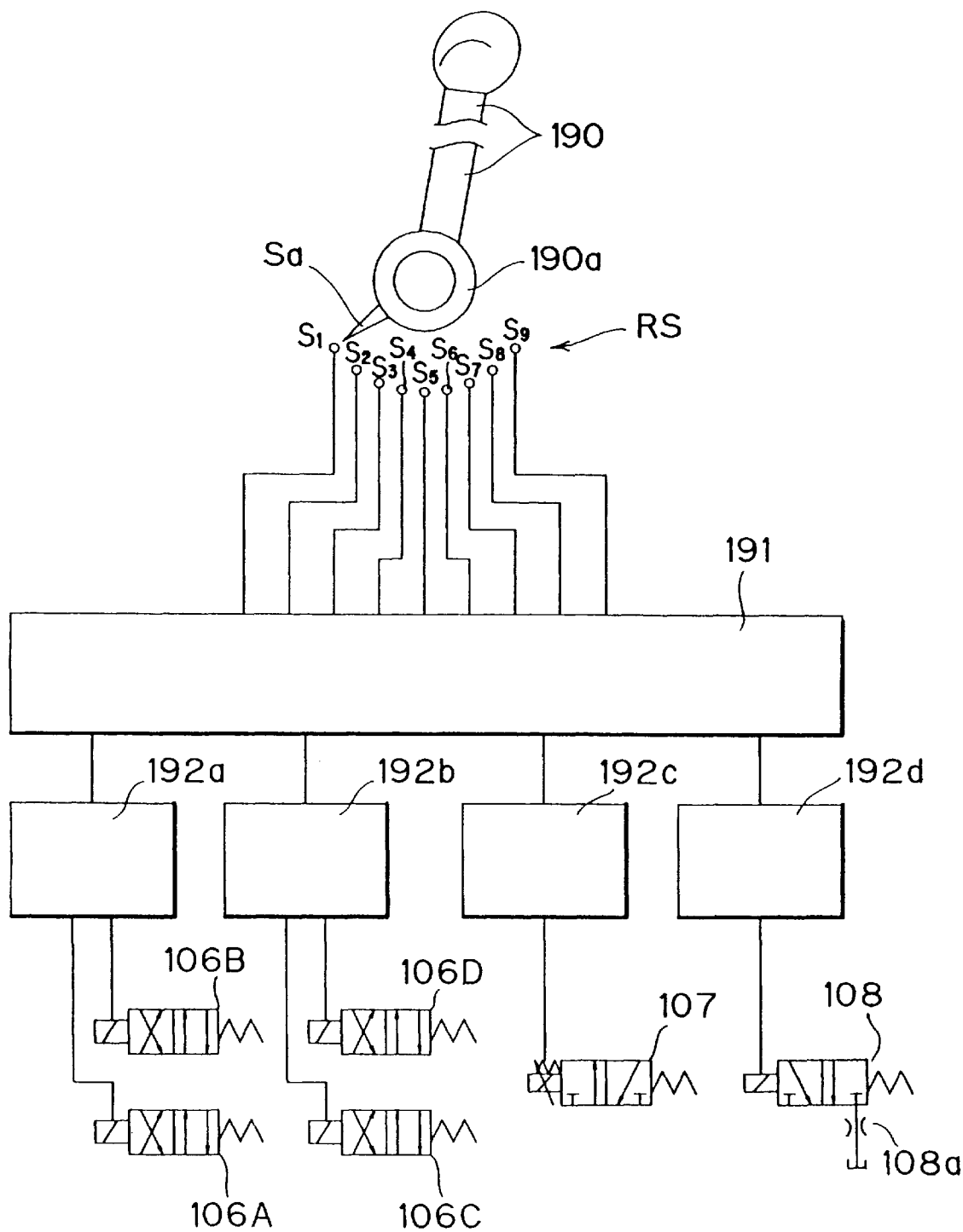
FIG. 16 is a block diagram showing a controller for the first and second fluid-operated speed change mechanisms shown in FIGS. 2 and 4.

Electromagnetic directional control valves 106A, 106B, 106C and 106D for the first and second fluid-operated speed change mechanisms 23 and 24 are operated or controlled by a main change lever 190 which is arranged, as shown in FIG. 1, at one side of the seat 12. As shown in FIG. 16, there is provided a rotary switch RS a movable contact Sa of which is attached to a cylindrical portion 190a co-rotatable with the main change lever 190. Nine fixed contacts S1, S2, S3, S4, S5, S6, S7, S8 and S9 of the rotary switch RS are provided in correspondence to nine change ratios which can be obtained by the combination of the first fluid-operated speed change mechanism 23 and second fluid-operated speed change mechanism 24. A controller is connected to the rotary switch RS and comprises a shift-up and shift-down judgment portion 191, an energization and deenergization control portion 192a for the electromagnetic directional control valves 106A and 106B, an energization and deenergization control portion 192b for the electromagnetic directional control valves 106C and 106D, an energization and deenergization control portion 192c for the electromagnetic proportional valve 107, and an energization and deenergization control portion 192d for the electromagnetic control valve 108. The judgment portion 191 is operable to judge shifting-up or shifting-down operation from a change ratio to another change ratio and provides signals to the energization and deenergization control portions 192a, 192b, 192c and 192d. The energization and deenergization control portions 192a and 192b are operable to control energization and deenergization of the electromagnetic directional control valves 106A–106D in response to the shifting operation. The energization and deenergization control portion 192c is operable to provide signal to the electromagnetic proportional valve 107 so as to attain a predetermined pressure-increasing characteristic in response to a selected change ratio. The energization and deenergization control portion 192d is operable to once displace the electromagnetic control valve 108 for controlling the drain of fluid from the position A to the position B so as to restrict the drain of fluid and to thereby attain a predetermined pressure-lowering characteristic.

Figure 17:
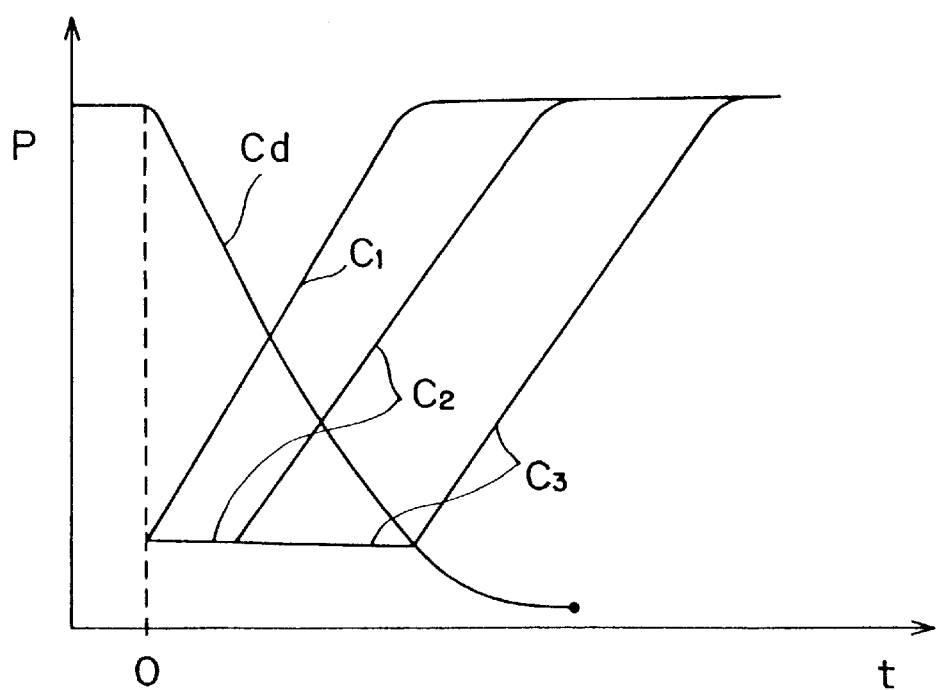
FIG. 17 is a schematic graph showing the control modes of fluid pressure by the controller shown in FIG. 16.

FIG. 17 schematically shows how the fluid pressure is controlled by the controller 191 and 192a–192d. The controller increases the fluid pressure P applied to a fluid-actuated clutch relative to time t after the shifting operation along curve C1, C2 or C3 in response to a shifting-up or shifting-down operation from a specified change ratio to another specified change ratio. On the other hand, the controller controls operation of the electromagnetic control valve 108 so as to restrict the drain of fluid from a fluid-actuated clutch having been engaged before the shifting operation and to thereby lower the fluid pressure applied to the clutch along curve Cd, for example. A clutch having been engaged before the shifting operation becomes disengaged through a slipping condition, and a clutch to be engaged after the shifting operation becomes engaged through a slipping condition. The controller will select or determine the pressure-lowering characteristic and pressure-increasing characteristic in response to a shifting operation in a high or low speed range and to a shifting-up or shifting-down operation so as to attain a smooth speed change characteristic.

Figure 18:
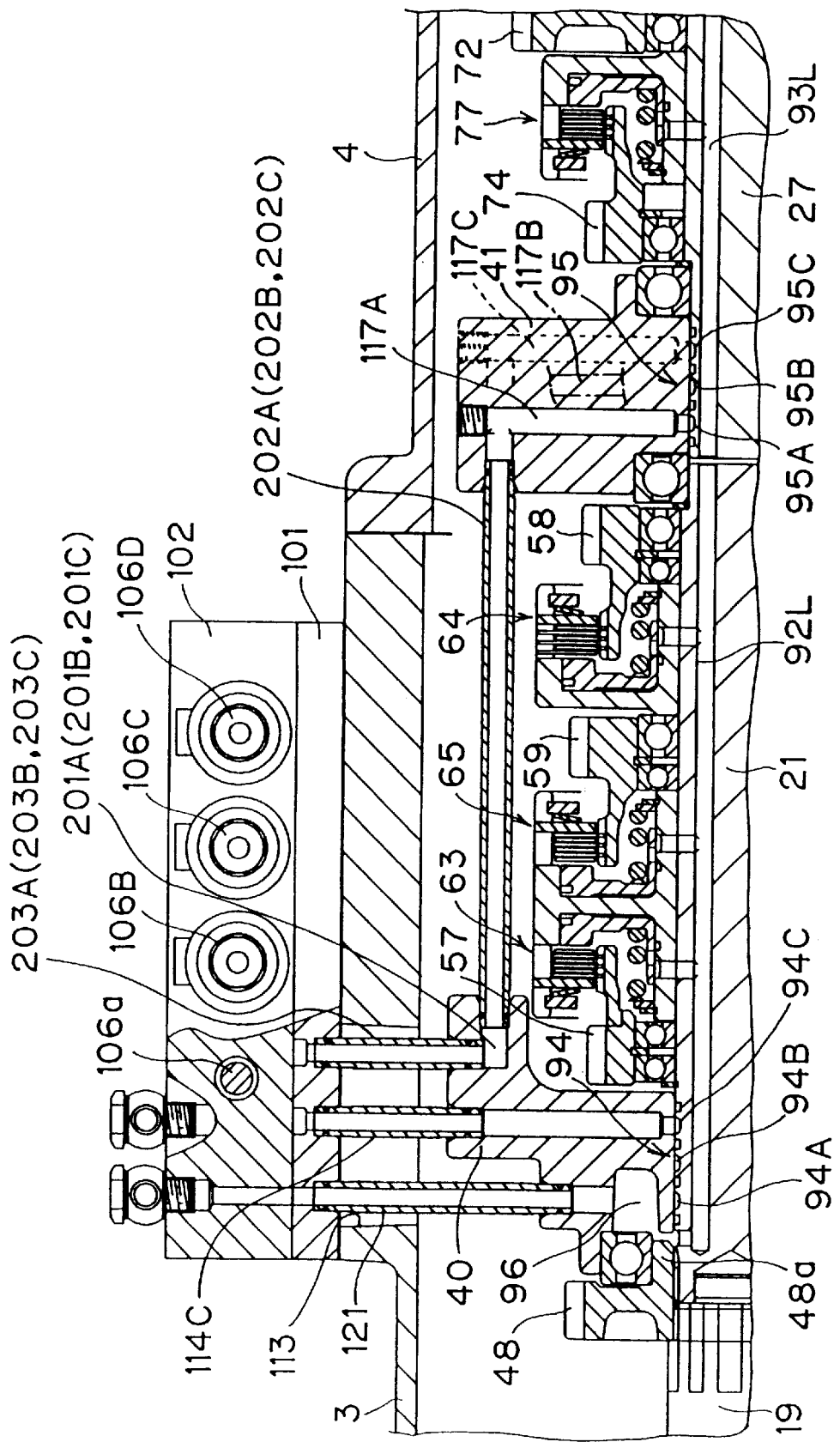
FIG. 18 is a sectional plane view similar to FIG. 11 but showing a second embodiment of the drive transmission assembly according to the present invention.

FIG. 18 shows a second embodiment with regard to the connection between fluid passages in the valve block 102 and fluid passages in the second bearing support frame 41. In this embodiment, the fluid passages in the first bearing support frame 40 are connected to the fluid passages in the valve plate 102 in the same manner as in the first embodiment but another three fluid passages 201A, 201B and 201C are formed in the first bearing support frame 40 such that these passages open, at both ends thereof, at a side surface and at a rear surface of the support frame 40. The second bearing support frame 41 includes three fluid passages 117A, 117B and 117C, communicating with the rotary joints 95, so as to open at a front surface of the support frame 41, and pipes 202A, 202B and 202C are bridged between the first and second bearing support frames 40 and 41 for connecting between the fluid passages 201A, 201B and 201C and the fluid passages 117A, 117B and 117C. The plate member 101 includes another three fluid passages which communicate with corresponding three fluid passages in the valve block 102, and these fluid passages in the plate member 101 are connected to the fluid passages 201A, 201B and 201C by pipes 203A, 203B and 203C which extend through the opening 113 of a side wall of the front housing 3.

Figure 19:
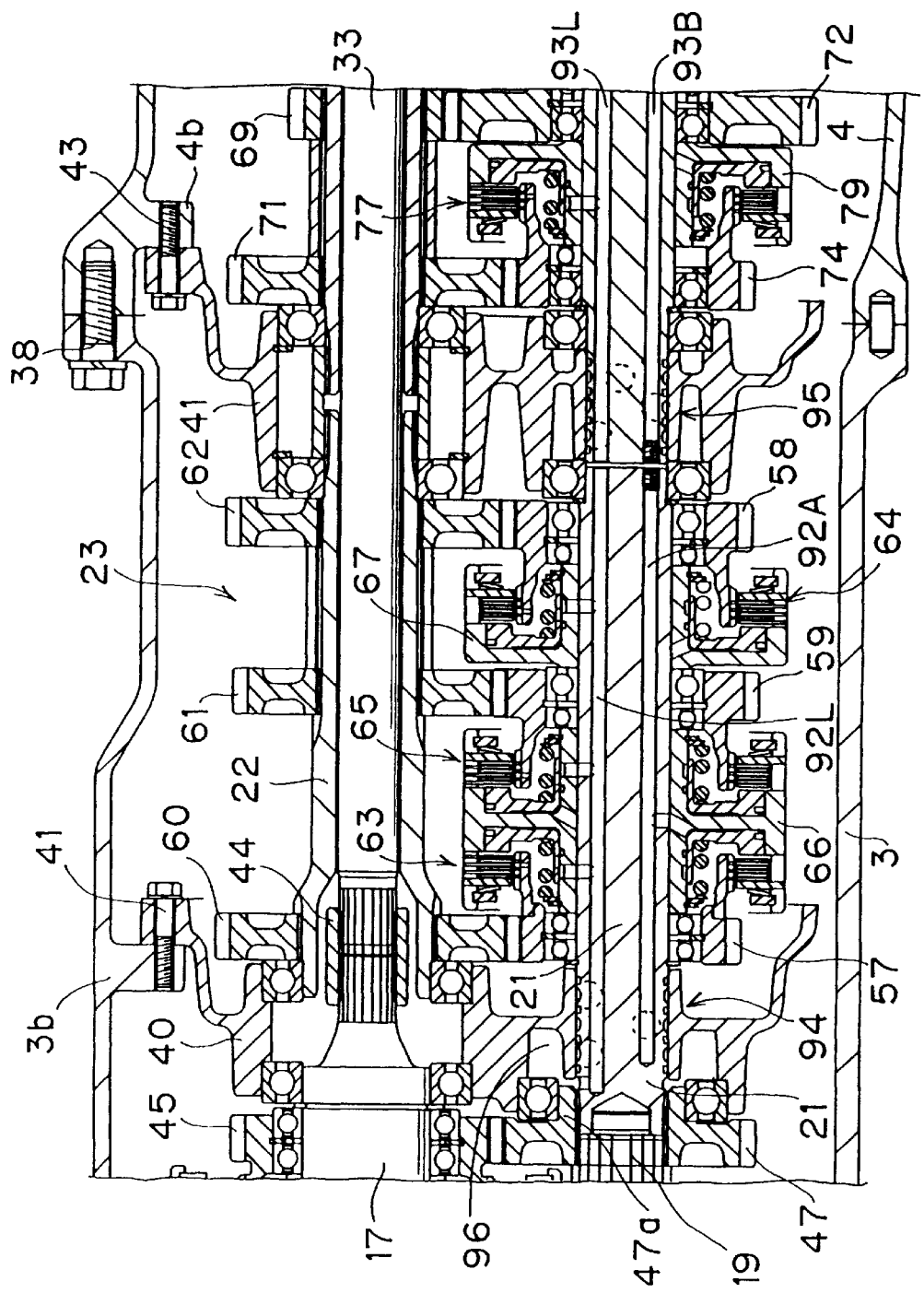
FIG. 19 is a sectional side view of a part of FIG. 4 but showing a third embodiment of the drive transmission assembly according to the present invention.
Figure 20:
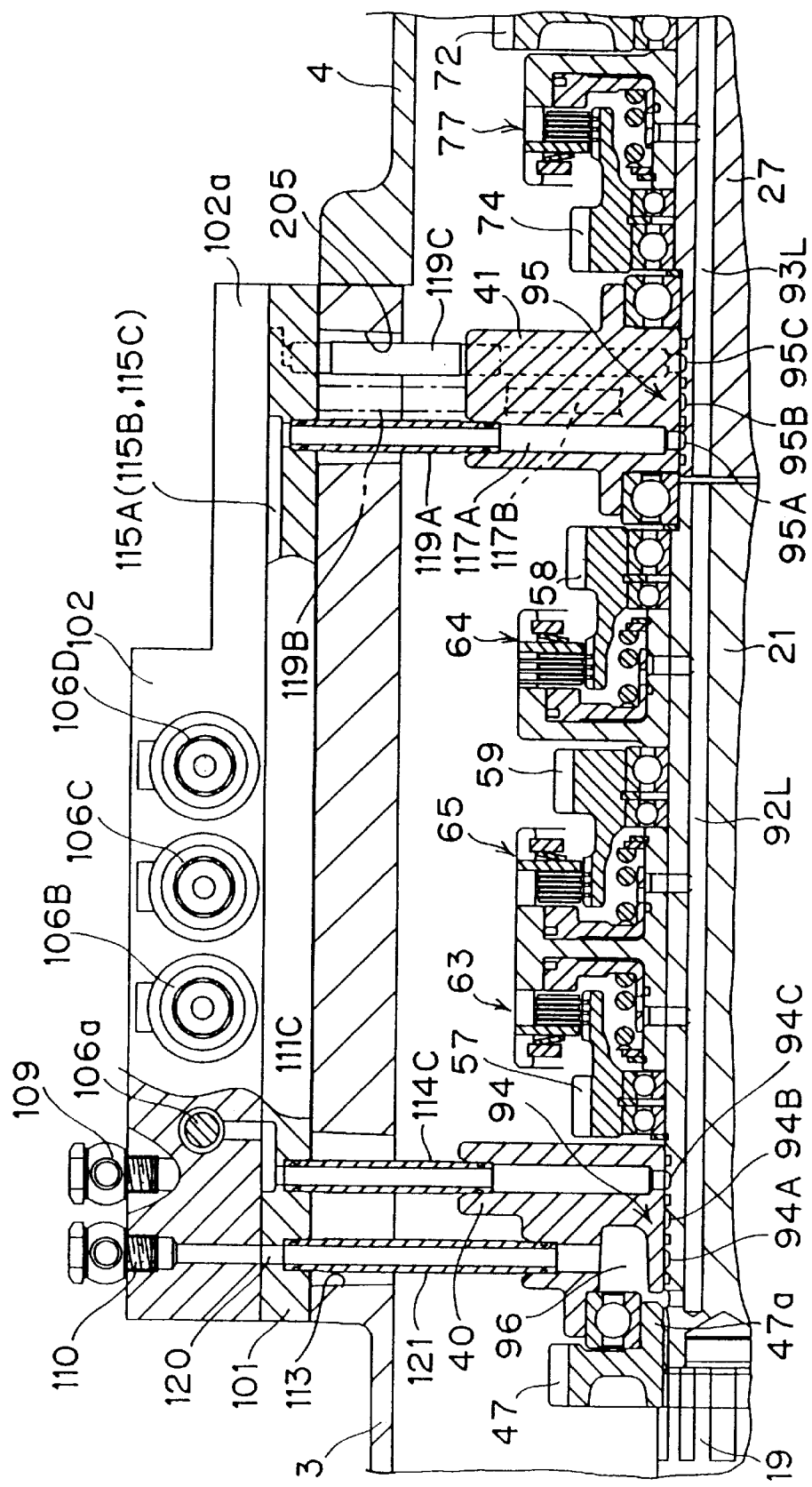
FIG. 20 is a sectional plane view similar to FIG. 11 but showing the third embodiment.

FIGS. 19 and 20 show a third embodiment with regard to the arrangement of second bearing support frame 41 and with regard to the connection between fluid passages in the valve block 102 and fluid passages in the second bearing support frame 41. As shown in FIG. 19, the second bearing support frame 41 is supported by the middle housing 4 as in the first embodiment but it extends into the front housing 3. As shown in FIG. 20, the valve block 102 has a rearward extension 102a, and fluid passages 115A, 115B and 115C, communicating with fluid passages in the valve block 102, are formed at an interface between the extension 102a and the plate member 101. Side wall of the front housing 3 includes another opening 205, and the fluid passages 117A, 117B and 117C in the second bearing support frame 41 are connected to the fluid passages 115A, 115B and 115C by pipes 119A, 119B and 119C which extend through the opening 205. Additionally, the forward directional gear train composed of gears 45 and 47 in the direction-reversing mechanism 20 is arranged at the rear side of this mechanism in the third embodiment, and the output shaft 19 and drive shaft 21 are coupled using a boss portion 47a of the gear 47 as a coupling member.

Figure 21:
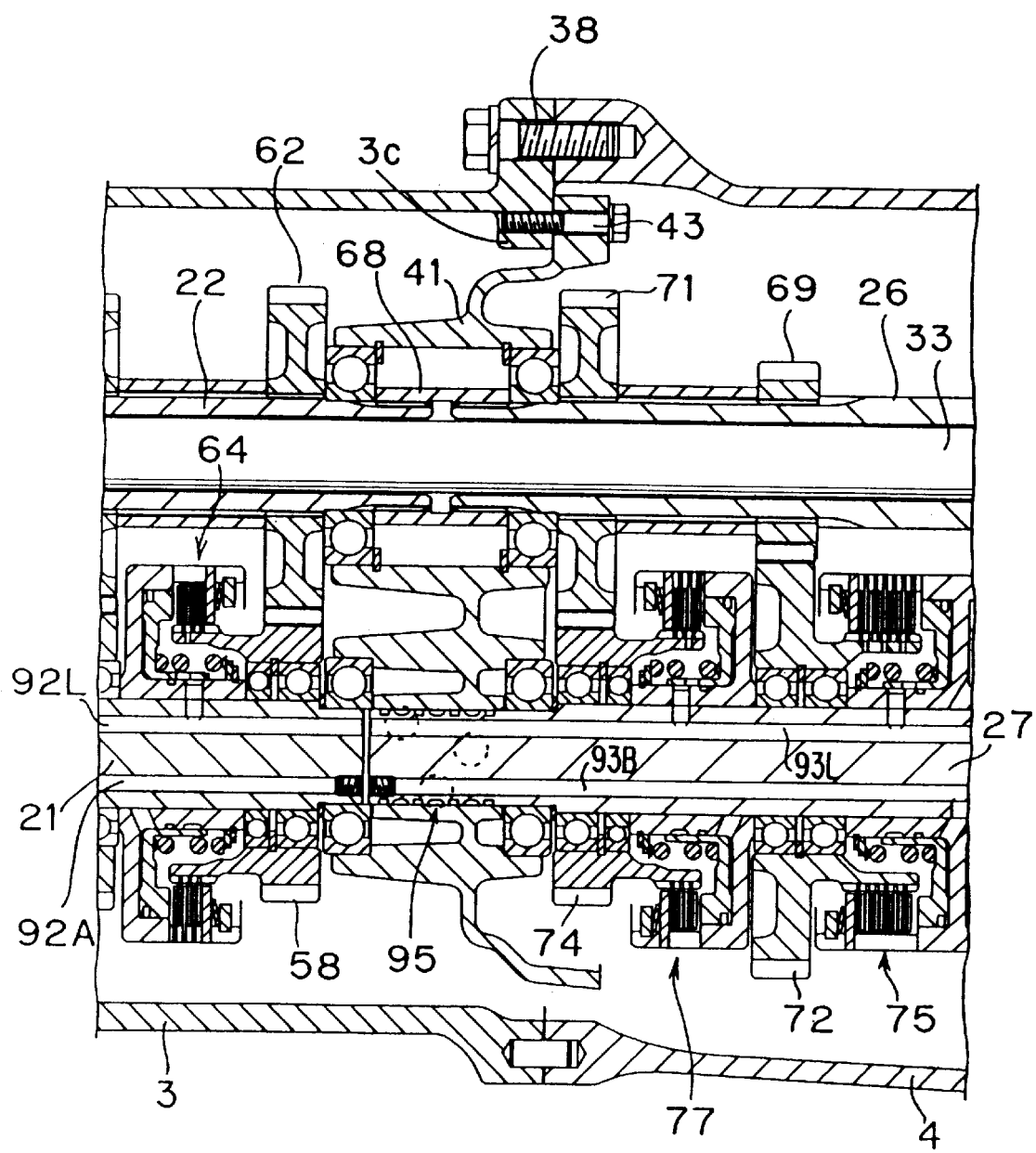
FIG. 21 is a sectional side view similar to a part of FIG. 4 but showing a fourth embodiment of the drive transmission assembly according to the present invention.

FIG. 21 shows a fourth embodiment with regard to the support and arrangement of second bearing support frame 41. In this embodiment, the second bearing support frame 41 is attached to boss portions 3c, projecting inwardly from an inner surface of the rear end of front housing 3, using bolts 43 threadingly engaged to the boss portions 3c from the side of middle housing 4, and extends into the front housing 3. In assembly, the second bearing support frame 41 is attached, after the first fluid-operated speed change mechanism 23 has been assembled into a rear half of the front housing 3, to the boss portions 3c with the rear end portions of drive shaft 21 and driven shaft 22 being supported by the support frame 41 and, then, the front housing 3 is fastened to the middle housing 4, having the second fluid-operated speed change mechanism 24 previously assembled into a front half thereof, with the front end portions of drive shaft 26 and driven shaft 27 being supported by the support frame 41 and with the driven shaft 22 and drive shaft 26 being coupled by the coupling member 68. In each of the embodiment, the first and second bearing support frames 40 and 41 contribute towards an easy assembly of the transmission.

The tractor shown can start only when the pedal 169 shown in FIG. 13 is once trodden down fully to displace the shut-off valve 158 to its open position II where fluid is supplied towards the fluid-actuated clutches 50 and 51. The tractor then starts gradually by gradually releasing the pedal 169 so as to gradually increase fluid pressure, which is determined by the pressure-reducing valve 159 and is applied to the clutch 50 or 51, and to thereby engage the clutch through a slippingly engaged condition. Thus, the direction-reversing mechanism 20 can be used as a main clutch. Shifting operation of the first and second fluid-operated speed change mechanisms 23 and 24 is carried out while the direction-reversing mechanism 20 is in its operated condition. The mechanical speed change mechanism 25 is set up previously to a desired change ratio in response to the running condition of vehicle, but can also be shifted during the running of vehicle in a condition where the fluid-actuated clutch 50 or 51 in the reversing mechanism 20 is once disengaged either by displacing the directional control valve 160 to its neutral position N or by displacing the reducing valve 159 to its unloading position C by operating the pedal 169.

Although the direction-reversing mechanism 20, which is also used as a main clutch, controls a large change in torque when the vehicle starts and although the reversing mechanism 20 is used also for running the vehicle at a low speed by engaging the clutch 50 or 51 in a slippingly engaged condition by means of pressure-reducing valve 159, the frictional elements of the clutch 50 and 51 are sufficietly lubricated so as to avoid wearing thereof because the lubricant supply system for the clutches 50 and 51 or frictional elements thereof is independently provided and because lubricant is supplied sufficiently only to the clutch 50 or 51 in the engaged condition by the flow regulator valves 172F and 172R shown in FIG. 13. Because fluid-actuated clutches 50 and 51 are arranged on the primary drive shaft 17 which is located at a high level in the direction-reversing mechanism 20, the clutches 50 and 51 are not immersed in fluid or oil in the vehicle body so that drag torque, which can be transmitted by the frictional elements in the neutral condition of clutches, is reduced. On the other hand, fluid-actuated clutches 63, 64, 65, 75, 76 and 77 of first and second fluid-operated speed change mechanisms 23 and 24 are arranged on the drive shaft 21 and driven shaft 27, which are located at a low level in the change mechanisms 23 and 24, so that these clutches are immersed in fluid or oil in the vehicle body whereby cooling thereof is enhanced.

Figure 22:
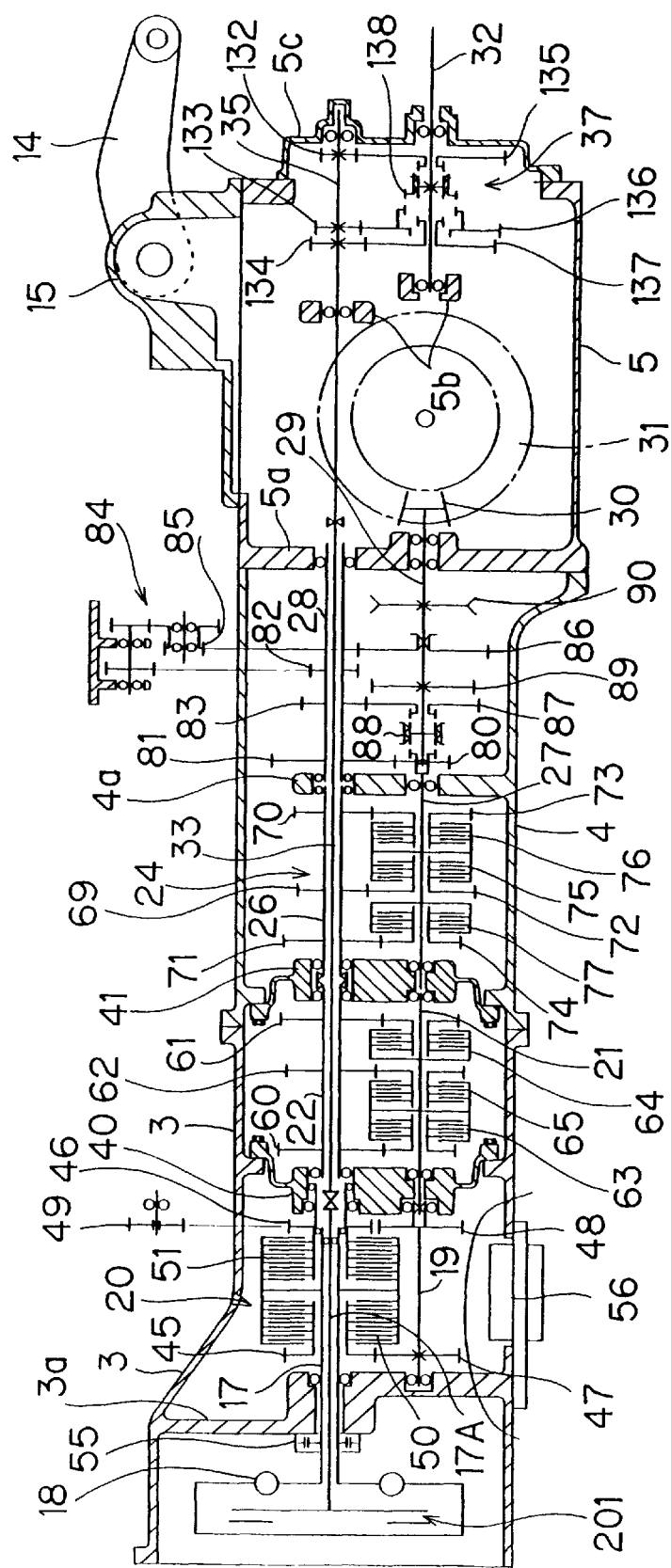
FIG. 22 is a schematic sectional side view, partially developed, similar to FIG. 2 but showing the whole of the transmission assembly employed in a tractor in which a fifth embodiment of the drive transmission assembly according to the present invention is employed.
Figure 23:
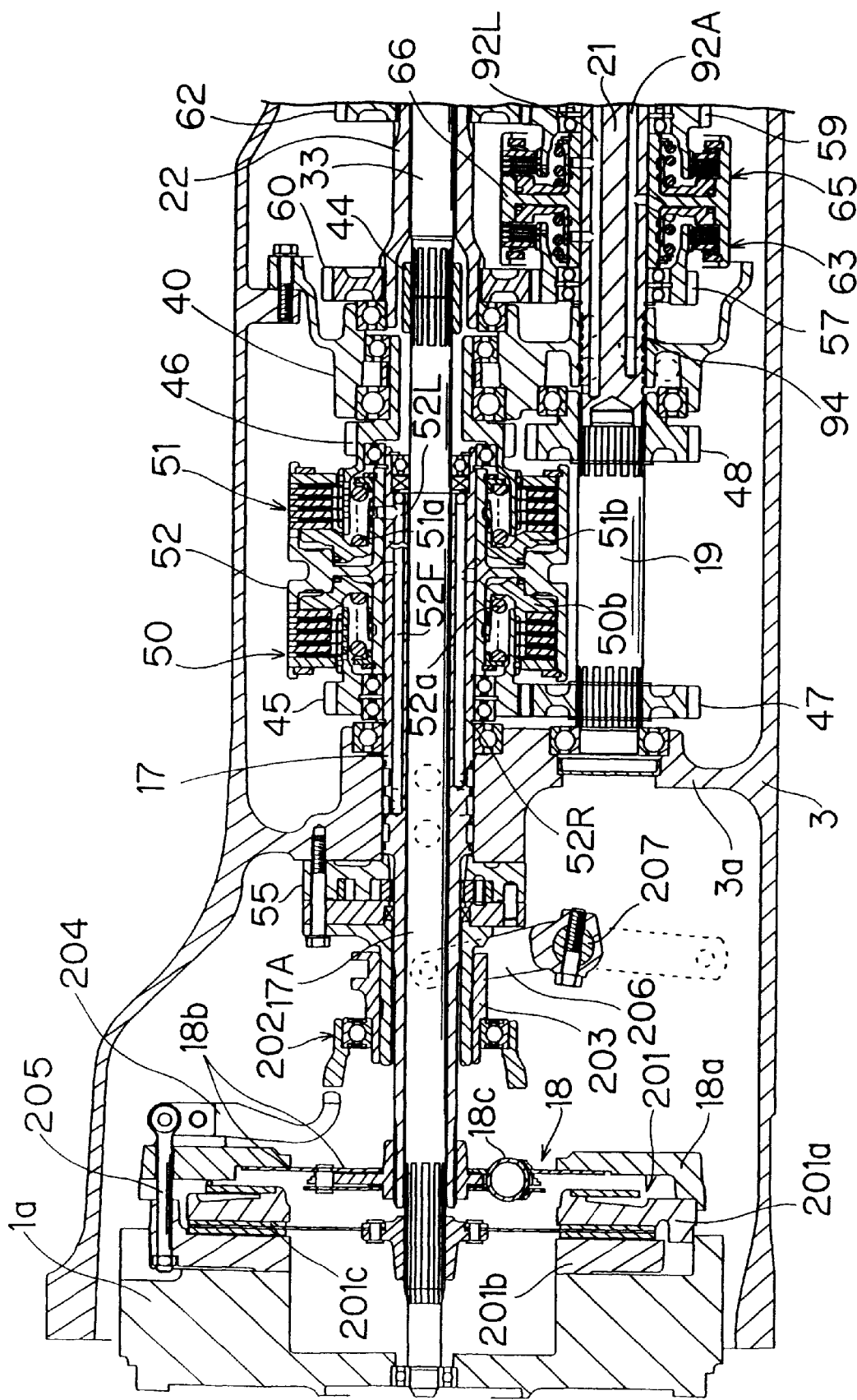
FIG. 23 is a sectional side view similar to FIG. 3 but showing the fifth embodiment.

In the first embodiment, PTO clutch 36 of a fluid-actuated multi-disk type is provided in the rear housing 5 and power take-off mechanism is provided for taking off pump-driving power from the transmission shaft 34, located before the PTO clutch 36, using the hydraulic lift case 15 as a support therefor. But, a mechanical PTO clutch can also be employed in place of the fluid-actuated PTO clutch. FIGS. 22 and 23 illustrate a fifth embodiment in which a mechanical PTO clutch is employed and in which the power take-off mechanism for taking off pump-driving power is eliminated.

As shown in FIGS. 22 and 23, a hollow drive shaft 17 is provided as a primary drive shaft for the vehicle drive line and is connected to the engine flywheel 1a through a shock-absorbing spring mechanism 18. A drive shaft 17A, which extends through the hollow drive shaft 17 and is connected to the transmission shaft 33 by a coupling member 44, is provided as a primary drive shaft for the power take-off line and is connected to the engine flywheel 1a through a mechanical PTO clutch 201. The PTO clutch 201 comprises a thrust ring 201a secured to the flywheel 1a, a pressure plate 201b, and a diaphragm spring 201c which is secured to the drive shaft 17A and is interposed between the thrust ring 201a and pressure plate 201b. This clutch 201 is engaged by displacing the pressure plate 201b rearwards to thereby engage the diaphragm spring 201c frictionally with the thrust ring 201a. The shock-absorbing spring mechanism 18 comprises a cover member 18a, which is secured to the thrust ring 201a so as to be driven by the flywheel 1a, and diaphragm springs 18b and torsion springs 18c for connecting between the cover member 18a and hollow drive shaft 17.

For operating the mechanical PTO clutch 201, there are provided a slidable bearing assembly 202 mounted on a hollow support shaft 203 which is disposed on the hollow drive shaft 17 and is fixedly secured to the support wall 3a, one or more levers 204 which are rockingly displaced by the bearing assembly 202, and one or more pins 205 which are displaced axially by the levers 204 so as to displace the pressure plate 201b. The bearing assembly 202 is operated to slide by a yoke 206 which is fixedly mounted on a laterally extending clutch-operating rotatable shaft 207 which in turn is connected to a PTO-clutch lever (not shown) at an outside of the front housing 3.

I claim:

1. A drive transmission assembly for working vehicles comprising:

a first fluid-operated speed change mechanism (23) operable to perform a speed change transmission between a first drive shaft (21) and a first driven shaft (22), which are arranged in parallel with each other, by a selective actuation of plural fluid-actuated clutches (63, 64, 65), and a second fluid-operated speed change mechanism (24) operable to perform a speed change transmission between a second drive shaft (26) and a second driven shaft (27) by a selective actuation of plural fluid-actuated clutches (75, 76, 77), said first and second speed change mechanisms (23, 24) being arranged within a vehicle body (2) in series in a longitudinal direction of said vehicle body and being connected in series with each other;

wherein said first drive shaft (21) is arranged at a level lower than that of said first driven shaft (22), said plural fluid-actuated cluches (63, 64, 65) of said first speed change mechanism (23) being mounted on said first drive shaft (21); and wherein said second drive shaft (26) is arranged co-axially with and is coupled to said first driven shaft (22) whereas said second driven shaft (27) is arranged in parallel with said second drive shaft (26) at a level lower than that of said second drive shaft, said plural fluid-actuated clutches (75, 76, 77) of said second fluid-operated speed change mechanism (24) being mounted on said second driven shaft (27).

2. The drive transmission assembly as set forth in claim 1, wherein said vehicle body (2) comprises a first body housing (3), having an open rear end and including therein said first fluid-operated speed change mechanism (23), and a second body housing (4) having an open front end and including therein said second fluid-operated speed change mechanism (24), said second body housing being secured to said first body housing, and wherein a bearing support frame (41) is disposed within said vehicle body (2) and is fixedly attached to one of said first and second body housings (3, 4), said bearing support frame supporting rear end portions of said first drive and driven shafts (21, 22) and front end portions of said second drive and driven shafts (26, 27).

3. The drive transmission assembly as set forth in claim 2, wherein said first driven shaft (22) and said second drive shaft (26) are detachably coupled to each other by a coupling member (68) which is disposed within said bearing support frame (41).

4. A drive transmission assembly for working vehicles comprising:

a direction-reversing mechanism (20) operable to change running direction of the vehicle between a primary shaft (17) and an output shaft (19) which are arranged in parallel with each other, a first fluid-operated speed change mechanism (23) operable to perform a speed change transmission between a first drive shaft (21) and a first driven shaft (22), which are arranged in parallel with each other, by a selective actuation of plural fluid-actuated clutches (63, 64, 65), and a second fluid-operated speed change mechanism (24) operable to perform a speed change transmission between a second drive shaft (26) and a second driven shaft (27) by a selective actuation of plural fluid-actuated clutches (75, 76, 77), said direction-reversing mechanism (20) and said first and second speed change mechanisms (23, 24) being arranged within a vehicle body (2) in series in a longitudinal direction of said vehicle body and being connected in series with each other;

wherein said output shaft (19) is arranged at a level lower than that of said primary shaft (17) whereas said first drive shaft (21) is arranged co-axially with and is coupled to said output shaft (19) at a level lower than that of said first driven shaft (22), said plural fluid-actuated cluches (63, 64, 65) of said first speed change mechanism (23) being mounted on said first drive shaft (21); and wherein said second drive shaft (26) is arranged co-axially with and is coupled to said first driven shaft (22) whereas said second driven shaft (27) is arranged in parallel with said second drive shaft (26) at a level lower than that of said second drive shaft, said plural fluid-actuated clutches (75, 76, 77) of said second fluid-operated speed change mechanism (24) being mounted on said second driven shaft (27).

5. The drive transmission assembly as set forth in claim 4, wherein said direction-reversing mechanism (20) comprises a forward directional fluid-actuated clutch (50) and a backward directional fluid-actuated clutch (51) which are mounted on said primary shaft (17).

6. The drive transmission assembly as set forth in claim 4, wherein said vehicle body (2) includes in it a first bearing support frame (40) for supporting rear end portions of said primary shaft (17) and output shaft (19) and for supporting front end portions of said first drive and driven shafts (21, 22) and a second bearing support frame (41) for supporting rear end portions of said first drive and driven shafts (21, 22) and for supporting front end portions of said second drive and driven shafts (26, 27), wherein said first drive shaft (21) includes in it fluid passages (92A, 92B, 92C) for supplying fluid to said clutches (63, 64, 65) of said first fluid-operated speed change mechanism (23), said first bearing support frame (40) including in it first rotary joint portions (94) for connecting said fluid passages (92A, 92B, 92C) in said first drive shaft (21) to stationary fluid passages, and wherein said second driven shaft (27) includes in it fluid passages (93A, 93B, 93C) for supplying fluid to said fluid-actuated clutches (75, 76, 77) of said second fluid-operated speed change mechanism (24), said second bearing support frame (41) including in it second rotary joint portions (95) for connecting said fluid passages (93A, 93B, 93C) in said second driven shaft (27) to stationary fluid passages.

7. The drive transmission assembly as set forth in claim 6, wherein said vehicle body (2) comprises a first body housing (3), including said direction-reversing mechanism (20) and said first fluid-operated speed change mechanism (23), and a second body housing (4) including said second fluid-operated speed change mechanism (24), said first bearing support frame (40) being fixedly supported by said first body housing (3) and said second bearing support frame (41) being fixedly supported by one of said first and second body housings (3, 4), and wherein said first rotary joint portions (94) are provided by annular fluid chambers (94A, 94B, 94C) disposed between said first drive shaft (21) and said first bearing support frame (40) whereas said second rotary joint portions (95) are provided by annular fluid chambers (95A, 95B, 95C) disposed between said second driven shaft (27) and said second bearing support frame (41).

8. The drive transmission assembly as set forth in claim 6, wherein directional control valve means (106A, 106B, 106C, 106D) for controlling the supply of fluid to said fluid-actuated clutches (63, 64, 65) of said first fluid-operated speed change mechanism (23) and to said fluid-actuated clutches (75, 76, 77) of said second fluid-operated speed change mechanism (24) are disposed in a valve block (102) which is secured to an outer surface of a side wall of said vehicle body (2) at a location generally between said first and second bearing support frames (40, 41) as viewed in a longitudinal direction of said vehicle body.

9. The drive transmission assembly as set forth in claim 8, wherein said side wall of said vehicle body (2) includes at least one opening (113; 113, 205) which is covered by said valve block (102), conduit members (114A, 114B, 114C; 114A, 14B, 114C, 119A, 119B, 119C) for conducting fluid to at least one of said first and second rotary joint portions (94, 95) being bridged between said valve block (102) and at least one of said first and second bearing support frames (40, 41).

10. The drive transmission assembly as set forth in claim 8, wherein a fluid pressure-controlling valve (107) for controlling fluid pressure applied to said fluid-actuated clutches (63, 64, 65, 75, 76, 77) in response to a displacement of said directional control valve means (114A, 114B, 114C, 114D) is disposed in said valve block (102).

11. The drive transmission assembly as set forth in claim 6, wherein said first drive shaft (21) includes in it a first lubricant passage (92L) for supplying lubricant to frictional elements of said fluid-actuated clutches (63, 64, 65) on said first drive shaft (21) whereas said second driven shaft (27) includes in it a second lubricant passage (93L) for supplying lubricant to frictional elements of said fluid-actuated clutches (75, 76, 77) on said second driven shaft (27), said first and second lubricant passages (92L, 93L) being communicated to each other within said second bearing support frame (41), and wherein one of said first and second bearing support frames (40, 41) includes in it a lubricant supply passage (96) which is communicated to said first and second lubricant passages (92L, 93L).

12. The drive transmission assembly as set forth in claim 4, wherein a mechanical speed change mechanism (25) is disposed between said second driven shaft (27) and a propeller shaft (29) which is arranged co-axially with said second driven shaft, said mechanical speed change mechanism (25) including a counter shaft (28), which is arranged in parallel with said propeller shaft (29) and is connected co-rotatably to said second driven shaft (27), and being operable to perform a speed change transmission including one change ratio, in which said propeller shaft (29) is directly connected to said second driven shaft (27), and at least one change ratio in which said propeller shaft (29) is connected to said second driven shaft (27) through said counter shaft (28).

13. The drive transmission assembly as set forth in claim 12, wherein said vehicle body (2) comprises a first body housing (3), having an open rear end and including therein said direction-reversing mechanism (20) and said first fluid-operated speed change mechanism (23), and a second body housing (4) having an open front end, an intermediate support wall (4a) and a rear end opening and including therein said second fluid-operated speed change mechanism (24) and said mechanical speed change mechanism (25), said second body housing being secured to said first body housing, said intermediate support wall (4a) supporting rear end porions of said second drive and driven shafts (26, 27) and front end portions of said counter shaft 28 and propeller shaft 29, wherein a first bearing support frame (40) is disposed within said vehicle body (2) and is fixedly attached to said first body housing (3), said first bearing support frame supporting rear end portions of said primary shaft and output shaft (17, 19) and front end portions of said first drive and driven shafts (21, 22), and wherein a second bearing support frame (41) is disposed within said vehicle body (2) and is fixedly attached to one of said first and second body housings (3, 4), said second bearing support frame supporting rear end portions of said first drive and driven shafts (21, 22) and front end portions of said second drive and driven shafts (26, 27).

14. The drive transmission assembly as set forth in claim 13, wherein said output shaft (19) and said first drive shaft (21) are detachably coupled to each other by a first coupling member (48a; 47a) which is disposed within said first bearing support frame (40), and wherein said first driven shaft (22) and said second drive shaft (26) are detachably coupled to each other by a second coupling member (68) which is disposed within said second bearing support frame (41).

* * * * *